United States Patent [19]

Masaki et al.

[11] 4,027,478
[45] June 7, 1977

[54] MULTIPLE-CYLINDER INTERNAL COMBUSTION ENGINE

[75] Inventors: Kenji Masaki, Yokohama; Naomi Tokura, Yokosuka, both of Japan

[73] Assignee: Nissan Motor Co., Ltd., Japan

[22] Filed: Oct. 1, 1975

[21] Appl. No.: 618,406

[30] Foreign Application Priority Data

Oct. 3, 1974  Japan ............................ 49-114175

[52] U.S. Cl. ................................. 60/285; 60/286; 60/290; 60/298; 123/117 R; 123/122 D; 123/148 DS
[51] Int. Cl.² ...................... F01N 3/10; F02B 75/10
[58] Field of Search ............ 60/285, 286, 289, 290, 60/298, 282, 284; 123/148 DS, 117 R, 122 D

[56] References Cited

UNITED STATES PATENTS

| 3,106,820 | 10/1963 | Schaffer | 60/290 |
|---|---|---|---|
| 3,168,806 | 2/1965 | Calvert | 60/286 |
| 3,584,608 | 6/1971 | Shibagaki | 60/285 |
| 3,704,591 | 12/1972 | Tatsutomi | 60/285 |
| 3,776,205 | 12/1973 | Maruoka | 60/285 |
| 3,791,144 | 2/1974 | Lang | 60/285 |
| 3,812,673 | 5/1974 | Muroki | 60/286 |
| 3,827,237 | 8/1974 | Linder | 60/285 |
| 3,853,104 | 12/1974 | Nambu | 123/148 DS |
| 3,934,412 | 1/1976 | Masaki | 60/289 |

Primary Examiner—Douglas Hart
Attorney, Agent, or Firm—Robert E. Burns; Emmanuel J. Lobato; Bruce L. Adams

[57] ABSTRACT

A spark-ignition multiple cylinder internal combustion engine for an automotive vehicle, comprising a first set of cylinders operative on a relatively rich air-fuel mixture and a second set of cylinders operative on a relatively lean air-fuel mixture and having a thermal reactor incorporated into the exhaust system, the internal combustion engine being characterized by a comprehensive emission control system uniting various subsystems of the engine such as the air-intake, mixture induction, exhaust and ignition systems which are provided with means for cooling the thermal reactor by forced air in response to an unusual rise of the temperature of the thermal reactor, means for warming up air in the air-intake system at a rate related to engine load and the temperature of air in the intake system, means for supplying secondary air in accordance with the varying operating conditions of the engine, and means for retarding ignition timing during driving a cold engine.

13 Claims, 8 Drawing Figures

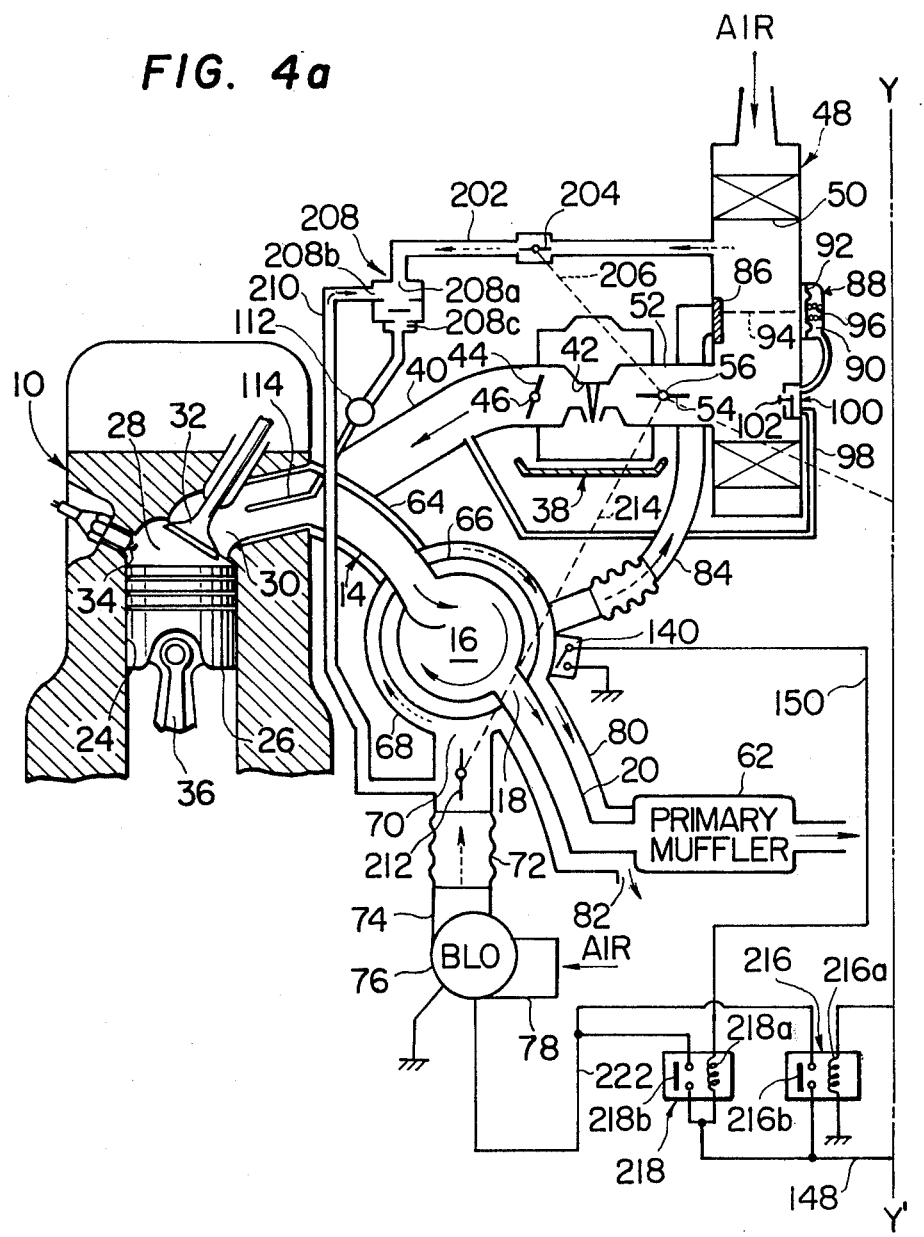

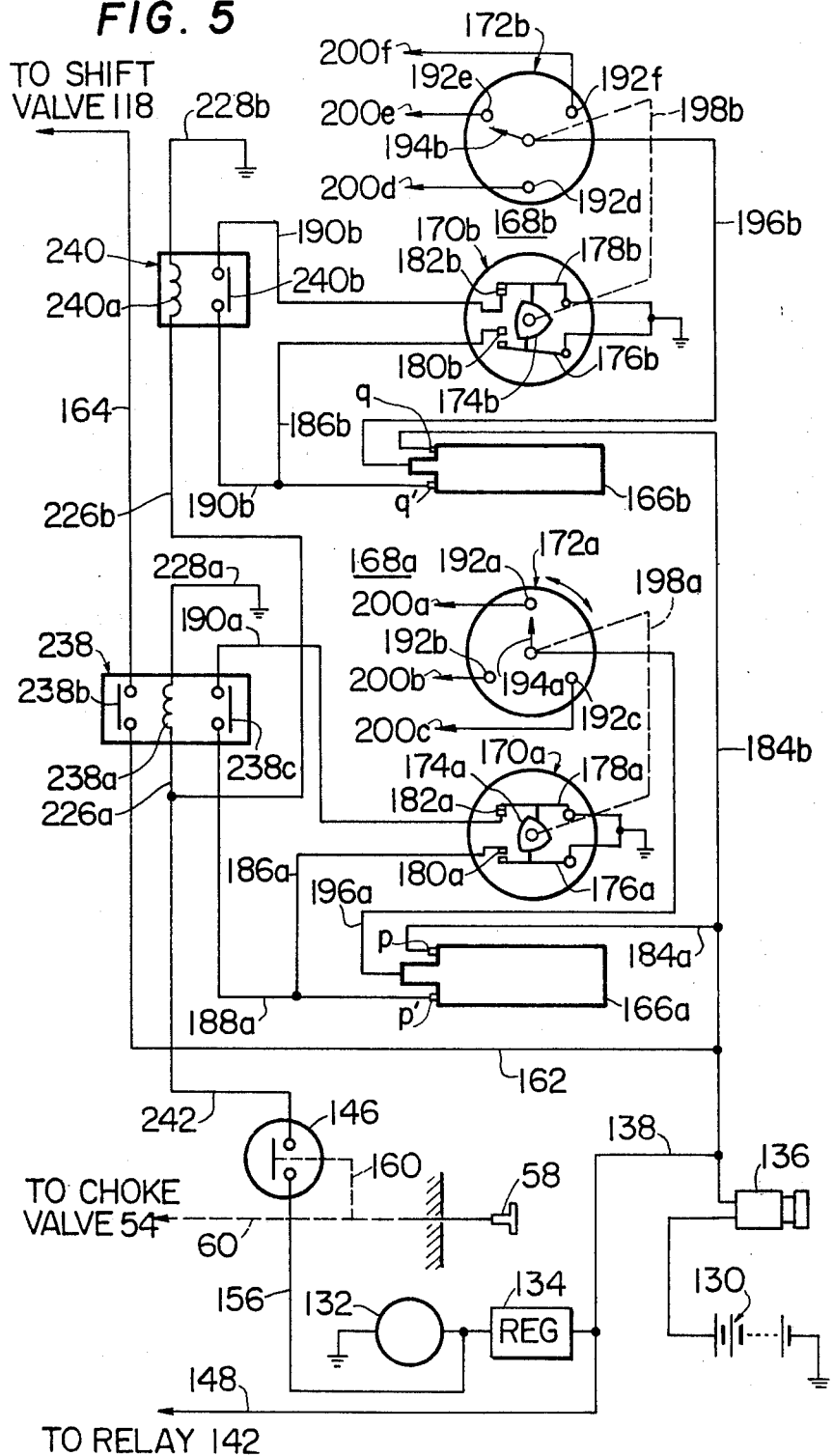

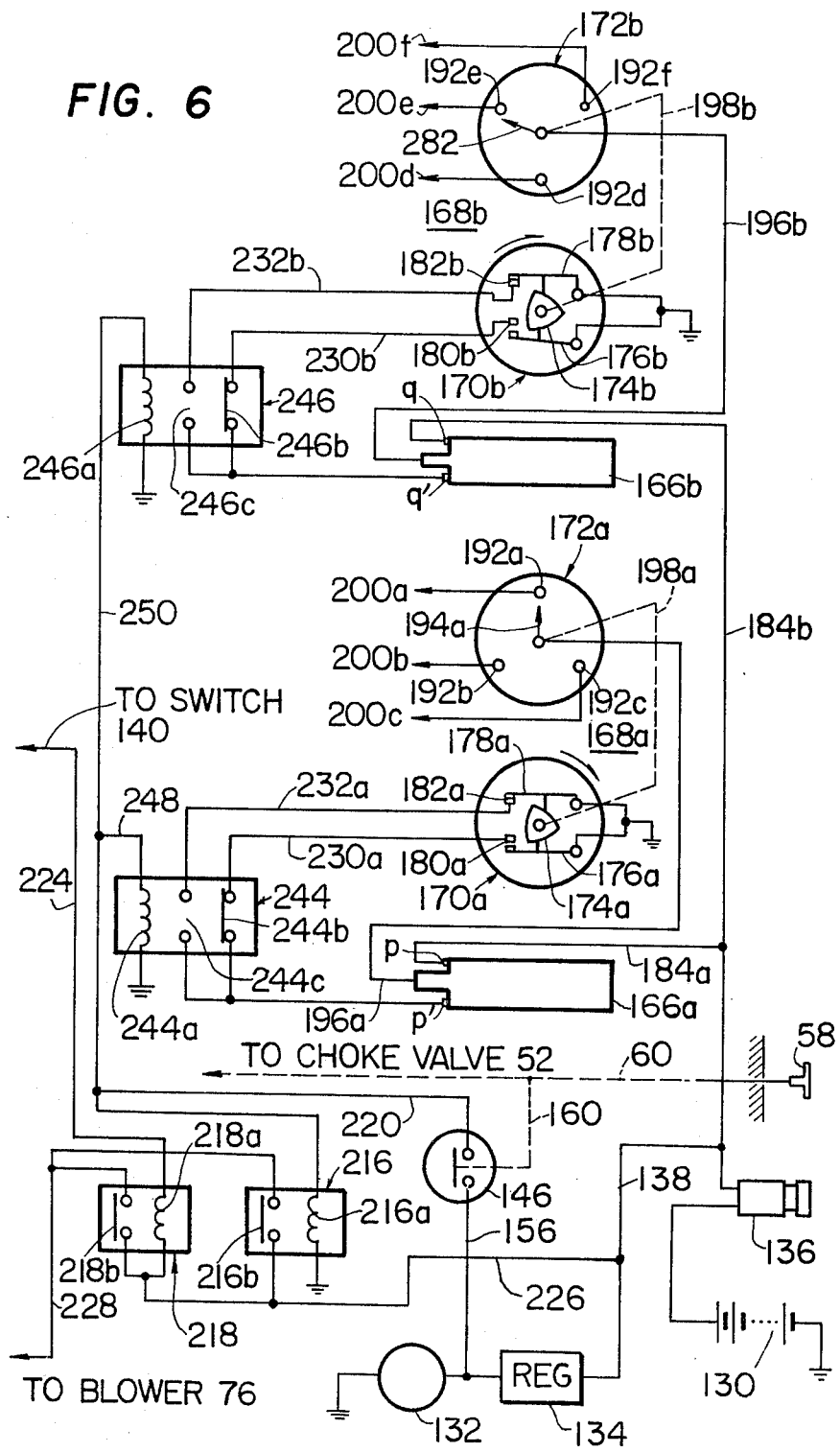

MULTIPLE-CYLINDER INTERNAL COMBUSTION ENGINE

BACKGROUND OF THE INVENTION

The present invention relates to internal combustion engines for automotive vehicles and more particularly to a spark-ignition multiple-cylinder internal combustion engine having an exhaust emission control arrangement.

For the purpose of reducing toxic combustible residues such as unburned hydrocarbons and carbon monoxide contained in the exhaust gases from automotive internal combustion engines, some modernized automotive vehicles are equipped with thermal reactors which are adapted to combust the combustible residues in the exhaust gases before the exhaust gases are discharged to the open air. To exploit the exhaust cleaning performance of the emission control devices of this nature and in an attempt to lessen not only the hydrocarbons and carbon monoxide but nitrogen oxides which are another important contributor to air pollution caused by automotive internal combustion engines, it has been proposed to have the cylinders of a multiple-cylinder internal combustion engine arranged in two groups and to supply a relatively rich air-fuel mixture to one group of cylinders (hereinafter referred to as rich-mixture cylinders) and a relatively lean air-fuel mixture to the other group of cylinders (hereinafter referred to as lean-mixture cylinders). The exhaust gases from the rich-mixture and lean-mixture cylinders are mixed together in the thermal reactor so that the toxic combustible compounds contained in higher proportion in the former than in the latter are completely oxidized with the agency of hot air which is contained in higher concentration in the latter than in the former. During idling or low-load operating condition of the engine, the temperature of the exhaust gases from the rich-mixture cylinders tends to lower so that the exhaust gases would fail to be completely oxidized in the thermal reactor unless the exhaust gases contain unburned hydrocarbons and carbon monoxide in relatively high concentrations. It is, for this reason, desirable to have the air-fuel mixture for the rich-mixture cylinders enriched during idling and low-load operating conditions of the engine. Enrichment of the mixture will also contribute to reducing formation of nitrogen oxides in the rich-mixture cylinders. As the load on the engine and the output speed of the engine are increased, the temperature of the exhaust gases rises so that exhaust gases can be sufficiently re-oxidized in the thermal reactor although the exhaust gases may contain combustible compounds in relatively low concentrations. The mixture to be supplied to the rich-mixture cylinders can thus be leaned out during medium to high load operating conditions of the engine. This will also give rise to an increase in the power output of the engine and will thus lend itself to reduction of the engine fuel consumption. The above mentioned range of the air-to-fuel ratio of the mixture to be supplied to the rich-mixture cylinders is determined with these in mind. On the other hand, the air-to-fuel ratio of the mixture to be supplied to the lean-mixture cylinders is determined in consideration of the extent to which the production of nitrogen oxides should be inhibited, the requirements for enabling the engine to smoothly operate, and the desired proportion of air to be contained in the exhaust gases emitted from the lean-mixture cylinders. From the purely theoretical point of view, the exhaust gases of an automotive internal combustion engine must be satisfactorily cleaned out if the engine is arranged and conditioned to bring the above described schemes to a successful issue. Actually, however, numerous operational parameters are involved in and related to the exhaust emission control performance of the internal combustion engine and, to take full advantage of the internal combustion engine of the described character, it is important that various emission control arrangements be made in the air-intake, mixture induction, exhaust and ignition systems of the engine and organically consolidated into a comprehensive system.

SUMMARY OF THE INVENTION

It is, accordingly, the object of the present invention to provide a spark-ignition multiple-cylinder internal combustion engine provided with a comprehensive emission control system unitting the various subsystems of the engine.

In accordance with the present invention, such an object will be accomplished basically in a spark-ignition multiple-cylinder internal combustion engine which comprises, in combination, first and second sets of cylinders, a mixture induction system for supplying an air-fuel mixture richer than a stoichiometric mixture to the first set of cylinders and an air-fuel mixture leaner than the stoichiometric mixture to the second set of cylinders, an air-intake system for supplying air to the mixture induction system, an exhaust system to which the cylinders are jointly connected, an exhaust re-combustion chamber incorporated into the exhaust system for mixing and re-combusting exhaust gases from the cylinders, first heat-exchange means associated with the exhaust re-combustion chamber and responsive to the temperature of the exhaust re-combustion chamber for absorbing heat from the re-combustion chamber in a heated condition, second heat-exchange means associated with the air-intake system and responsive to medium to low load operating conditions of the engine for warming up air in the air-intake system during the medium to low load operating condition, secondary-air supply means responsive to the temperature of the exhaust re-combustion chamber and to cold driving condition of the engine for supplying secondary air to the exhaust gases entering the exhaust re-combustion chamber at a rate varying with engine load during the medium to low load operating conditions and peaking up during the cold driving condition, and a spark-ignition system responsive to the cold driving condition of the engine for retarding the ignition timing of at least the first set of cylinders.

The secondary air supply means may comprise a positive displacement air-feed unit having a suction port communicating with the air-intake system, an air-feed passageway providing communication between the delivery port of the air-feed unit and the exhaust port of each of the cylinders, and air-discharge valve means connected to the air-feed passageway and responsive to the vacuum developed in a downstream portion of the mixture induction system, the cold driving condition of the engine and the temperature of the exhaust re-combustion chamber for regulating the flow of air through the air-feed passageway on the basis of the vacuum during medium to low operating conditions of the engine, providing substantially unrestricted communication between the air feed passageway and the exhaust port of each of the cylinders under the cold driving condition of the engine, and providing unlimited communication between the air-feed passageway and the atmosphere when the temperature of the exhaust re-combustion chamber rises to a predetermined level.

The first heat-exchange means may comprise an air jacket having a portion embracing the exhaust re-combustion chamber, an electrically-operated positive-displacement air-feed unit for feeding air into the air jacket when energized, and an electric control circuit responsive to the temperature of the exhaust re-combustion chamber and operative to energize the air-feed unit when the temperature of the exhaust re-combustion chamber rises to a predetermined level. In this instance, the second heat-exchange means may comprise a hot-air passageway leading from the air jacket and terminating in the air-intake system and valve means responsive to medium to low load operating conditions of the engine and operative to control the flow of air directed from the hot-air passageway into the air-intake system in dependence on engine load. Where the first and second heat-exchange means are thus arranged, the secondary-air supply means may comprise an air-feed passageway leading from the air-intake system, first flow shut-off means in the air-feed passageway, the flow shut-off means being responsive to cold driving condition of the engine for closing the air-feed passageway during the cold driving condition, a forced-air feed passageway leading from the positive-displacement air-feed unit, second flow shut-off means positioned between the air-feed unit and the air jacket, the second flow shut-off valve means being responsive to the cold driving condition of the engine for blocking communication between the air-feed unit and the air jacket during the cold driving condition of the engine, and a one-way check valve having a first inlet port communicating with the air-feed passageway over the first flow shut-off valve means, a second inlet port in constant communication with the forced air-feed passageway and an outlet port communicating with the exhaust port of each of the cylinders, the one-way check valve being operative to provide communication between each of the first and second inlet ports and the outlet port thereof in the presence of suction in the outlet port or when the pressure of air in at least one of the first and second inlet ports is higher than a pressure developed in the outlet port.

The previously mentioned spark-ignition system may comprise an ignition coil, an ignition distributor having a first set of contact points arranged to provide spark-advance characteristics optimum for normal operating conditions of the cylinders and a second set of contact points arranged to provide ignition timings retarded from the spark-advance characteristics, and switch means responsive to cold driving condition of the engine and operative to provide electrical connection between the primary winding of the ignition coil and the first set of contact points during normal operating condition of the engine and between the primary winding of the ignition coil and the second set of contact points during driving the engine cold. As an alternative, the ignition system may comprise first and second ignition coils, first and second ignition distributors respectively connected to the spark plugs of the first and second sets of cylinders, the first distributor having a first set of contact points arranged to provide spark-advance characteristics optimum for normal operating conditions of the first set of cylinders and a second set of contact points arranged to provide ignition timings retarded from the spark-advance characteristics and the second ignition distributor having a first set of contact points arranged to provide spark-advance characteristics optimum for normal operating conditions of the second set of cylinders and a second set of contact points arranged to provide ignition timings which are retarded from the above mentioned spark-advance characteristics prescribed on the first set of contact points of the second ignition distributor, and first and second switch means which are responsive to cold driving condition of the engine and each of which is operative to provide electrical connection between the primary winding of each of the first and second ignition coils and the first set of contact points of both the first and second ignition distributors during the normal operating conditions of the engine and between the primary winding of both the first and second ignition coils and the second set of contact points of the first and second ignition distributors during the cold driving condition of the engine. If desired, in this instance, the second ignition distributor may have a single set of contact elements arranged to provide usual spark-advance characteristics so that the ignition timings of the second set of cylinders are dictated by the single set of contact points throughout the operation of the engine.

BRIEF DESCRIPTION OF THE DRAWINGS

The features and advantages of the multiple-cylinder internal combustion engine according to the present invention will become more apparent from the following description taken in conjunction with the accompanying drawings in which like reference numerals and characters stand for corresponding or similar units and elements in some figures and in which:

FIG. 5 is a diagram which illustrates an alternative example of the spark-ignition system incorporated into the internal combustion engine shown in FIG. 3; and FIG. 6 is a diagram similar to FIG. 5 but shows an alternative example of the spark ignition system incorporated into the internal combustion engine illustrated in FIG. 4

DESCRIPTION OF THE PREFERRED EMBODIMENTS

Figure 2:
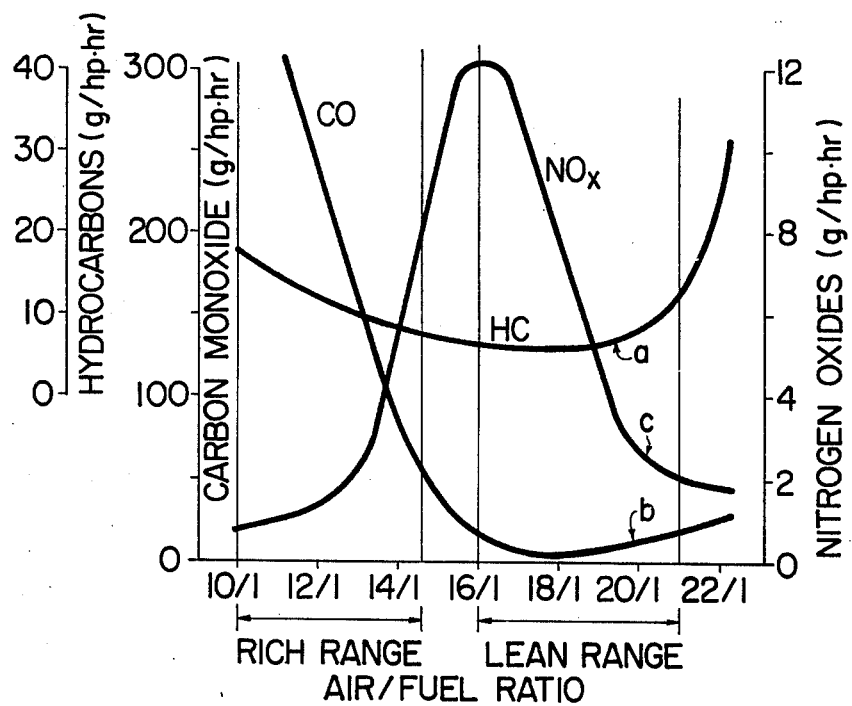
FIG. 2 is a graph which illustrates general tendencies of variation of the quantities, in terms of grams per horsepower per hour, of hydrocarbons (HC, indicated by curve $a$), carbon monoxide (CO, indicated by curve $b$) and nitrogen oxides ($NO_x$, indicated by curve $c$) in exhaust gases from a usual internal combustion engine with respect to the air-to-fuel ratio of the mixture supplied to the engine.
Figure 1:
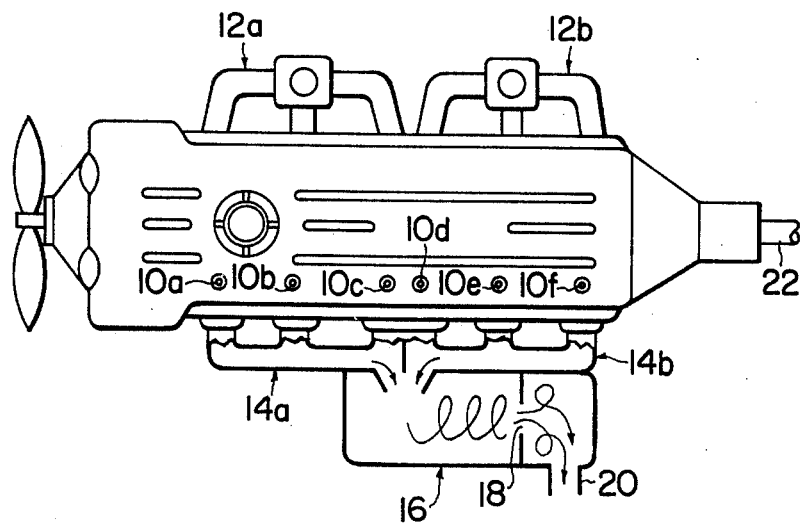
FIG. 1 is a schematic top view, partly in section, of a multiple-cylinder internal combustion engine to which the present invention generally appertains.

Referring to the drawings, first particularly to FIG. 1, the spark-ignition multiple-cylinder internal combustion engine incorporating the improvements according to the present invention is assumed, by way of example, to be an in-line six-cylinder engine having a first set of cylinders 10a, 10b and 10c and a second set of cylinders 10d, 10e and 10f as diagrammatically illustrated. The first set of cylinders 10a, 10b and 10c is assumed to consist of the rich-mixture cylinders which are jointly connected by way of an intake manifold 12a to a first mixture induction unit such as a carburetor (not shown) which is arranged to deliver an air-fuel mixture richer than the stoichio-metric mixture and thus has an air-to-fuel ratio of, for example, from about 10:1 to about 14.5:1 throughout the varying modes of operation of the engine. On the other hand, the second set of cylinders 10d, 10e and 10f is assumed to consist of the lean-mixture cylinders which are jointly connected by way of an intake manifold 12b to a second mixture induction unit such as a carburetor (not shown) arranged to deliver an air-fuel mixture leaner than the stoichiometric mixture and having an air-to-fuel ratio of, for example, from about 16:1 to about 21:1 throughout the varying modes of operation of the engine. The first set of cylinders 10a, 10b and 10c thus produce a relatively concentration of combustible residues of, for example, hydrocarbons (HC) and carbon monoxide (CO) in the exhaust gases emitted from the cylinders as will be understood from the curves a and b of FIG. 2, whilst the second set of cylinders 10d, 10e and 10f is adapted to inhibit formation of nitrogen oxides ($NO_x$) in the combustion chambers of the particular cyclinders as will be understood from the curve c of FIG. 2.

The first and second sets of cylinders have respective exhaust manifolds 14a and 14b which are jointly connected to an exhaust re-combustion chamber 16 constituting a thermal reactor. The exhaust re-combustion chamber 16 has an outlet port 18 which is in communication with an exhaust pipe 20. The exhaust pipe 20 is led to the open air by way of primary and secondary mufflers and a tail pipe as is customary, though not shown in FIG. 1. The exhaust gases emitted from each of the rich-mixture cylinders 10a, 10b and 10c and the exhaust gases from each of the lean-mixture cylinders 10d 10e and 10f are passed through the exhaust manifolds 14a and 14b into the exhaust re-combustion chamber 16 during the exhaust strokes of the individual pistons and are mixed together in the exhaust re-combustion chamber 16. The combustible residues of hydrocarbons and carbon monoxide which are contained in greater proportions in the exhaust gases from the rich-mixture cylinders 10a, 10b and 10c than in the exhaust gases from the lean-mixture cylinders 10d, 10e and 10f are consequently completely oxidized with the agency of hot air which is contained in greater proportion in the exhaust gases from the latter than in the exhaust gases from the former cylinders. Designated by referance numeral 22 is a crankshaft to which the pistons (not shown) in the above mentioned cylinders are individually connected.

The intake manifolds 12a and 12b of the first and second sets of cylinders have been assumed to be connected to the two independent carburetors which are respectively connected to the intake manifolds 12a and 12b, but both of the intake manifolds 12a and 12b may be jointly connected to a single carburetor, if desired. In this instance, the single carburetor is arranged in such a manner as to produce a relatively lean air-fuel mixture having an air-to-fuel ratio of, for example, from about 16:1 to about 21:1 and is provided with additional fuel delivery means adapted to supply a metered quantity of additional fuel to the air-fuel mixture to be directed into the rich-mixture cylinders 10a, 10b and 10c so that the initially produced relatively lean air-fuel mixture is enriched to have an air-to-fuel ratio of, for example, from about 10:1 to about 14.5:1. As an alternative, the single carburetor may be arranged in such a manner as to produce a relatively rich air-fuel mixture having an air-to-fuel ratio of, for example, from about 10:1 to about 14.5:1 and may be provided with mixture diluting means adapted to supply a metered quantity of additional air to the air-fuel mixture to be directed into the lean-mixture cylinders 10d, 10e and 10f so that the initially produced relatively rich air-fuel mixture is leaned out to have an air-to-fuel ratio of, for example, from about 16:1 to about 21:1. Still alternatively, the mixture induction system for the two sets of cylinders may be constituted by a common air intake system and by first and second fuel-injection units, one of which is arranged to supply each of the rich-mixture cylinders 10a, 10b and 10c with a relatively rich air-fuel mixture having an air-to-fuel ratio within the above mentioned rich range and the other to supply each of the lean-mixture cylinders 10d, 10e and 10f with a relatively lean air-fuel mixture having an air-to-fuel ratio within the above mentioned lean range.

Figure 3A:
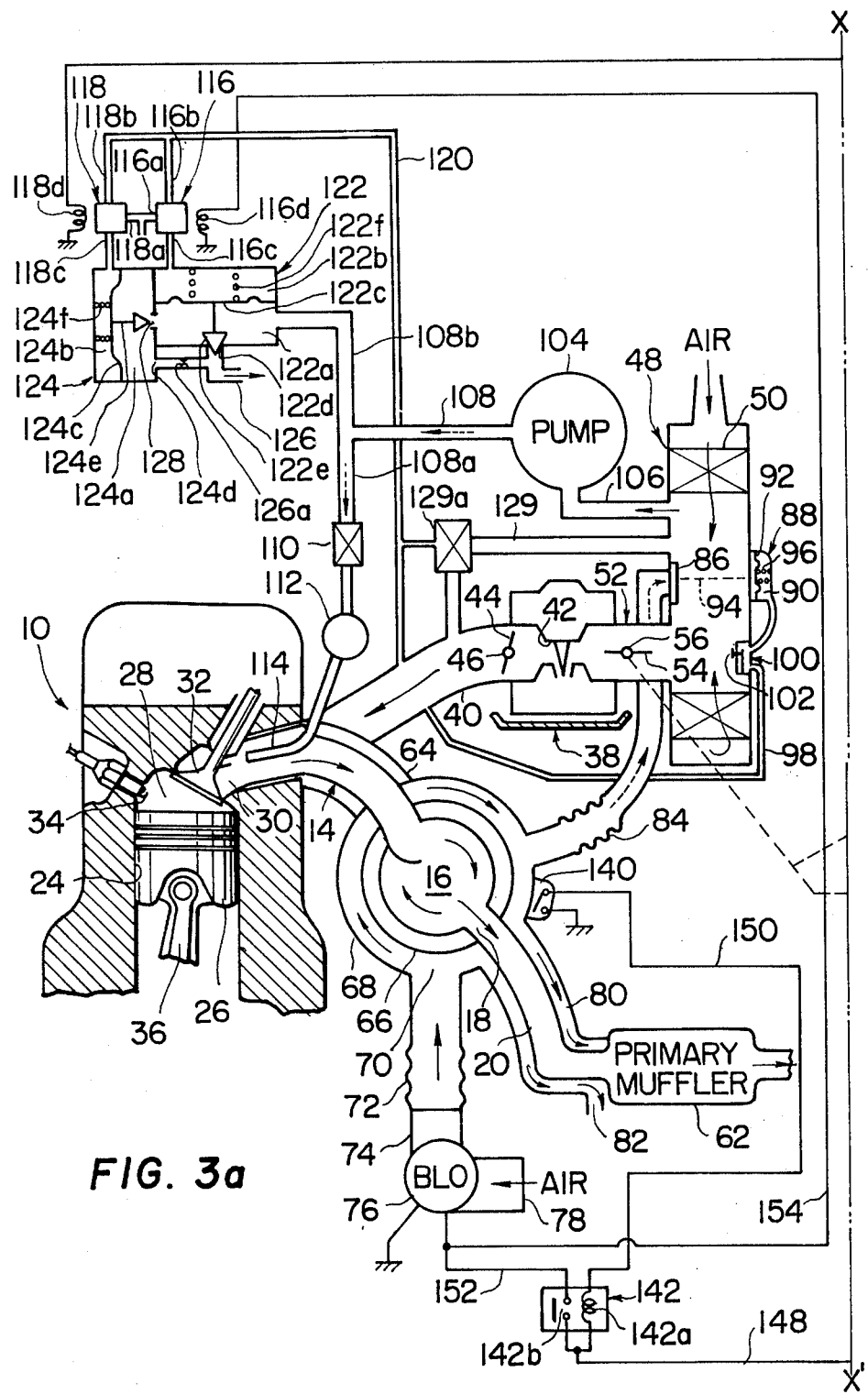
FIG. 3 is a schematic view showing a first preferred embodiment of the multiple-cylinder internal combustion engine according to the present invention.
Figure 3B:
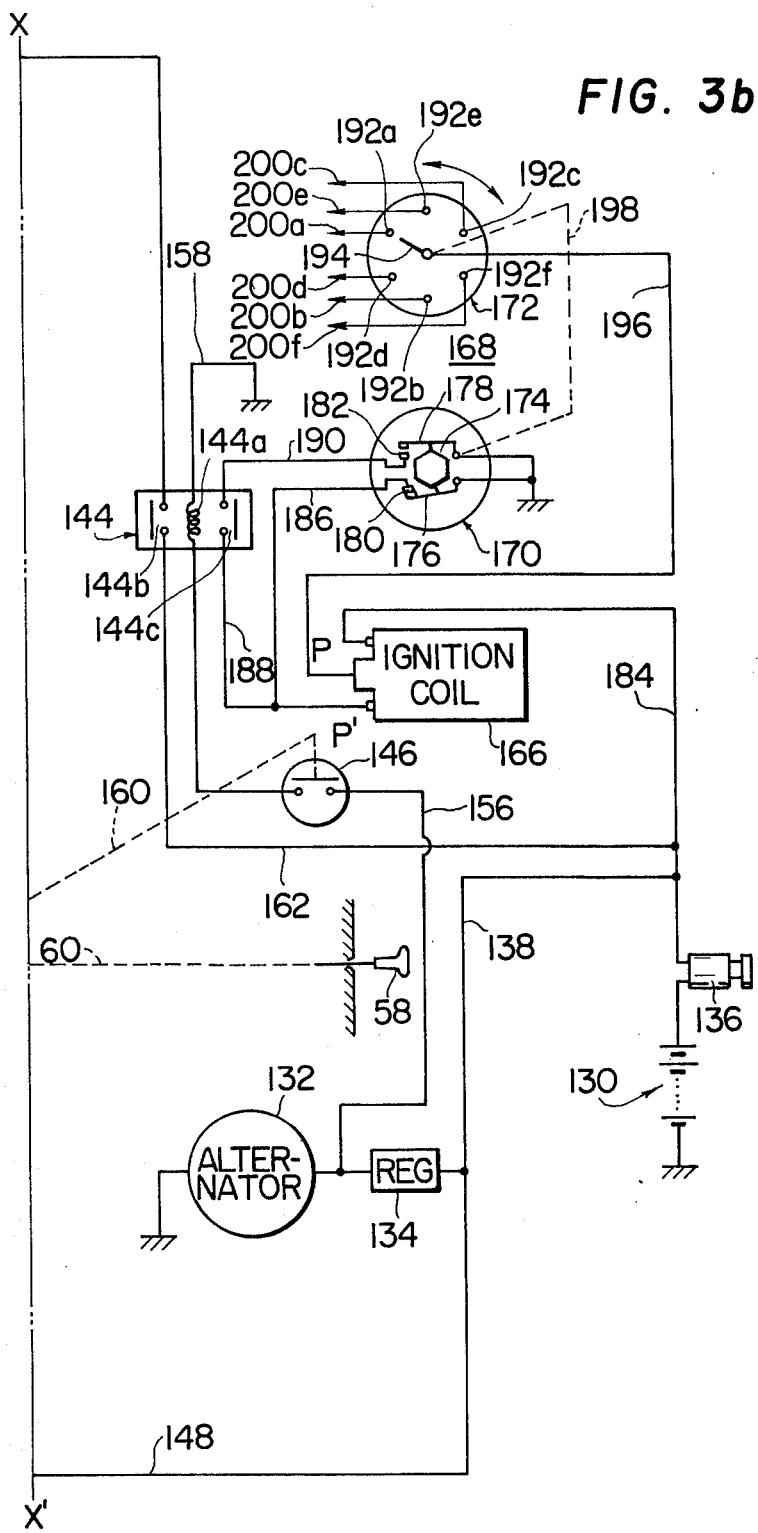

FIG. 3 shows a preferred example of the comprehensive emission control arrangement provided in conjunction with each of the above mentioned engine cylinders in accordance with the present invention. In FIG. 3, each of the cylinders 10a to 10f illustrated in FIG. 1 is represented by a cylinder 10 and is assumed to be of the overhead valve (or I-head) type by way of example. As is customary in the art, the cylinder 10 is formed with a cylinder bore 24 in which a reciprocating piston 26 is movable upwardly and downwardly. Above the top face of the piston 26 is formed a combustion chamber 28 which is in communication with an exhaust port 30 past an exhaust valve 32. Though not shown in the drawing, the combustion chamber 28 is also in communication with an intake port past an intake valve which is assumed to be located behind the exhaust valve 32 in the illustration of FIG. 3. An ignition spark plug 34 projects into the combustion chamber 28 for firing the air-fuel mixture drawn into the combustion chamber. The piston 26 is connected by a connecting rod 36 to the crankshaft 22 (FIG. 1) for driving the crankshaft when moved upwardly and downwardly during operation.

The internal combustion engine illustrated in FIG. 3 is assumed to have two independent carburetors one of which is connected to the set of rich-mixture cylinders and the other of which is connected to the set of lean-mixture cylinders. The intake port (not shown) of the cylinder 10 is, thus, in communication with a carburetor 38 by way of an intake manifold 40 which also communicates with the other cylinders of the group to which the cylinder 10 belongs though not shown in FIG. 3. The carburetor 38 per se is of the type well known in the art and has a venturi 42 into which a main fuel discharge nozzle projects and a throttle valve 44 located downstream of the venturi 42 and rotatable with a shaft 46 on the carburetor wall. The throttle valve 44 is driven from an accelerator pedal (not shown) for rotation about the axis of the shaft 46 and controls the flow of the air-fuel mixture through the carburetor 38. Air is supplied to the carburetor 38 by an air-intake system which comprises, as is customary in the art, an air cleaner 48 having a cleaning element 50 and an air horn 52 which is connected between the outlet of the air cleaner 48 and the upstream end of the carburetor 38. The air horn 52 has a choke valve 54 rotatable with a shaft 56 on the air horn wall for limiting the flow of air through the air horn 52 when the engine is being cranked from a cranking motor (not shown). The choke valve 54 is herein assumed to be of the manually operated type and is, thus, connected to a choke control knob 58 by a mechanical linkage 60 which may be a flexible wire. If desired, however, the choke valve 52 may be controlled in an automatic fashion by means of a heat-sensitive spring or spring section of the choke valve and a vacuum-operated piston as is well known in the art.

The exhaust port 30 communicates with an exhaust manifold 14 which is representative of both the exhaust manifold 14a associated with the rich-mixture cylinders 10a to 10c and the exhaust manifold 14b associated with the lean-mixture cylinders 10d to 10f shown in FIG. 1. The exhaust manifold 14 is open at its downstream end into the previously mentioned exhaust re-combustion chamber 16 which has its outlet port 18 communicating with the exhaust pipe 20. The exhaust pipe 20 leads to the open air by way of a primary muffler 62 and a secondary muffler (not shown). The exhaust manifold 14 and the exhaust re-combustion chamber 16 are shown covered with heat insulating layers 64 and 66, respectively.

During operation, atmospheric air drawn into the air cleaner as indicated by arrows is passed to the venturi 42 of the carburetor 38 through the air horn 52 with the choke valve 54 in a position to fully open the air horn 52 and is mixed with fuel which is ejected into the venturi 42 from the main fuel discharge nozzle projecting into the venturi. The resultant mixture of air and fuel is delivered into the intake manifold 40 past the throttle valve 46 at a rate dictated by the opening degree of the throttle valve 46. The air-fuel mixture is then drawn into the combustion chamber 28 through the intake port and past the intake valve during the intake stroke of the piston 26 and is fired in the combustion chamber 28 by means of the spark plug 34 at a predetermined timing toward the end of the compression stroke of the piston. The exhaust gases thus produced in the combustion chamber 28 are discharged during the exhaust stroke of the cylinder 10 through the exhaust port 30 and through the exhaust manifold 14 into the exhaust re-combustion chamber 16, where the exhaust gases are mixed with exhaust gases from another cylinder and are re-combusted to eliminate the combustible residues such as hydrocarbons and carbon monoxide contained therein. The exhaust gases thus cleared of the toxic combustible compounds are discharged to the open air through the exhaust pipe 20, as is usual in an ordinary internal combustion engine. The carburetor 38 is arranged in such a manner that the air-fuel mixture produced therein is richer than a stoichiometric mixture if the cylinder 10 is one of the rich-mixture cylinders 10a to 10c or leaner than the stoichiometric mixture if the cylinder 10 is one of the lean-mixture cylinders 10d to 10e shown in FIG. 1.

In accordance with the present invention, the exhaust re-combustion chamber 16, or more exactly the heat insulating layer 66 wrapping the re-combustion chamber 16 is embraced by an air jacket 68 having an air inlet port 70 which communicates through an air feed passageway 72 with the discharge port 74 of an electrically-operated positive-displacement air-feed unit such as a motor driven blower 76 having an air inlet vent 78 which is open to the atmosphere. The air jacket 68 is shown to have a tubular extension 80 embracing the exhaust pipe 20 extending between the outlet port 18 of the exhaust re-combustion chamber 14 and the primary muffler 62 and has an air outlet port 82 which is open to the atmosphere at the leading end of the tubular extension 80, viz., immediately anterior to the primary muffler 62. When, thus, the blower 76 is started, air is forced through the air-feed passageway 72 into the air jacket 68, circulated around the heat insulating layer 66 and thereafter along the exhaust pipe 20, and discharged to the open air through the air outlet port 82 at the leading end of the tubular extension 80 of the air jacket 68, as indicated by arrows.

When the engine is in operation, the exhaust gases discharged from the combustion chamber 28 of the cylinder 10 are admitted into the exhaust re-combustion chamber 16, mixed with the exhaust gases from another cylinder (which belongs to the group other than the group to which the cylinder 10 belongs), and re-combusted as previously noted. The exhaust re-combustion chamber 16 is consequently heated in part by initial heat of the exhaust gases entering the re-combustion chamber 16 and in part by the heat which is generated as a result of the re-combustion of the exhaust gases in the chamber 16. The heat is transferred from the exhaust re-combustion chamber 16 to the air jacket 68 through the heat insulating layer 66 wrapping the re-combustion chamber 16 and warms up air in the air jacket 68. Thus, the air jacket 68 forms part of exchange means operative to cool the exhaust re-combustion chamber 16 when the temperature of the re-combustion chamber 16 is above the temperature of the air jacket 16 and to warm the exhaust re-combustion chamber 16 by the heat stored therein when the tempperature of the re-combustion chamber 16 becomes lower than the temperature of the air jacket 68. To enable the air jacket 68 to provide such dual functions, arrangement is made so as to start the blower 76 for producing forced circulation of air through the air jacket 68 when the temperature of the exhaust re-combustion chamber 68 rises above a predetermined level and to hold the blower 76 at rest for maintaining air in the air jacket 68 stagnant when the temperature in the exhaust re-combustion chamber 68 is lower than the predetermined level, as will be described in more detail.

A hot-air passageway 84 leads from the air jacket 68 to the air cleaner 48 past an air flow control valve 86 so that hot air transferred into the air jacket 68 as above discussed is directed into the air cleaner 48 when the flow control valve 86 is in a position to open the passageway 84. The control valve 86 is operated by a vacuum-sensitive valve actuating unit 88 having a vauum chamber 90 which is isolated from the atmosphere by means of a diaphragm element 92. The diaphragm element 92 is connected to the control valve 86 by a suitable mechanical linkage such as a connecting rod 94 indicated by a broken line and is urged by suitable biasing means in a direction to urge the control valve 86 in a position to close the terminal end of the hot-air passageway 84. The above mentioned biasing means is herein shown, by way of example, as comprising a helical compression spring 96 mounted within the vacuum chamber 90 and seated at one end on the inner face of the diaphragm element 92. The vacuum chamber 90 is in communication with the intake manifold 40 through a vacuum passageway 98 having a vacuum flow control valve 100 incorporated therein. The vacuum flow control valve 100 includes a temperature-sensitive control element 102 which is located inside the air cleaner 48 and which is thus responsive to the temperature of air in the air cleaner 48 for causing the control valve 100 to reduce the rate of passage of vacuum across the valve 100 as the air in the air cleaner 48 is warmed up by the hot air introduced into the air cleaner through the hot-air passageway 84. The hot-air passageway 84, valve 86 and valve actuating unit 88 thus form heat exchange means for transferring heat from the exhaust recombustion chamber 16 to air in the air intake system. Provision of such heat exchange means is conductive to promoting atomization of fuel in the air-fuel mixture in the mixture induction system and to raising the combustion efficiency in the cylinder as will be apparent to those skilled in the art.

In an internal combustion engine having rich-mixture and lean-mixture cylinders, there is usually no positive need to supply secondary air to the exhaust gases before re-combustion since the exhaust gases from the lean-mixture cylinders inherently contain an excess of air. The internal combustion engine for automotive use is, however, subject to frequent fluctuations in load applied thereto over a relatively broad range and, due to such fluctuations of load on the engine, the respective concentrations of the air-fuel mixtures allocated for the two sets of cylinders tend to vary without respect to each other. It therefore follows that the air-fuel mixtures fed to the individual cylinders become richer, in the aggregate, than the stoichiometric mixture. This invites shortage of air in the exhaust gases for re-combustion and would result in interruption of combustion reactions in the exhaust re-combustion chamber. When, furthermore, the engine is being warmed up from cold, the choke valve is operated to enrich the air-fuel mixture to be supplied not only to the rich-mixture cylinders but to the lean-mixture cylinders. Principally for these two reasons, it is preferable to provide a secondary-air supply system in the internal combustion engine according to the present invention. As will be understood more clearly from the description to follow, the secondary-air supply system is arranged in such a manner as to feed the secondary air to the exhaust gases (1) at a maximum rate during driving of the engine cold and (2) at a limited rate during medium to low load operating conditions of the engine when the engine tends to produce an increased quantity of nitrogen oxides and (3) to feed no secondary air to the exhaust gases when the temperature of the exhaust re-combustion chamber 16 is increased above a predetermined upper limit.

Referring to FIG. 3, such a secondary-air supply system comprises an air pump 104 driven by the crankshaft (shown at 22 in FIG. 1) of the engine. The air pump 104 has a suction port communicating with the clean side of the air cleaner 48 through an air supply passageway 106 and a discharge port communicating through an air feed passageway 108 and over a one-way check valve 110 with an air gallery 112 which is in communication with the exhaust port of each of the cylinders 10a to 10f (FIG. 1) of the engine through, for example, air injection nozzles 114 which project into the exhaust port 14 of the cylinder 10 as shown. The one-way check valve 110 is provided for the purpose of preventing the exhaust gases from flowing backwardly from the exhaust port 30 into the air feed passageway 108 when the exhaust gases have a positive pressure above the pressure of air at the nozzle 114. The air gallery 112 is associated with all of the engine cylinders and serves as a manifold for distributing pumped air into the air injection nozzles in the exhaust ports of the individual cylinders. The secondary-air supply system further comprises first and second solenoid-operated two-position shift valves 116 and 118 having air inlet ports 116a and 118a, vacuum inlet ports 116b and 118b and outlet ports 116c and 118c, respectively. The air inlet ports 116a and 118a are directly open to the atmosphere whilst the vacuum inlet ports 116b and 118b are in communication with the intake manifold 14 of the engine by way of a vacuum passageway 120. The valves 116 and 118 are further shown to have respective solenoid coils 116d and 118d. The first two-position shift valve 116 is arranged in such a manner as to have a first condition providing communication between the air inlet port 116a and the outlet port 116c when the solenoid coil 116d remains de-energized and a second condition providing communication between the vacuum inlet port 116b and the outlet port 116c when the solenoid coil 116d is energized. On the other hand, the second two-position shift valve 118 is arranged in such a manner as to have a first condition providing communication between the vacuum inlet port 118b and the outlet port 118c when the solenoid coil 118d remains de-energized and a second condition providing communication between the air inlet port 118a and the outlet port 118c when the solenoid coil 118d is energized. The outlet ports 116c and 118c of the first and second two-position shift valves 116 and 118 thus arranged are connected to first and second differential-pressure operated valve units 122 and 124, respectively. The first differential-pressure operated valve unit 122 comprises an air chamber 122a in constant communication with the previously mentioned air feed passageway 108 leading from the air pump 104. Thus, the air feed passageway 108 has a first branch passageway 108a communicating over the one-way check valve 110 with the air-gallery 112 and a second branch passageway 108b communicating with the air chamber 122a of the valve units 122. The valve unit 122 further comprises a control chamber 122b in constant communication with the outlet port 116c of the first two-position shift valve 116 and isolated from the air chamber 122a by means of a diaphragm element 122c. The air chamber 122a has an outlet port 122d open to the atmosphere through an air discharge passageway 126 and the diaphragm element 122c has fixedly carried thereon a valve element 122e which is movable between a first position closing the outlet port 122d and a second position opening the outlet port 122d. The valve element 122e is urged to the first position by suitable mechanical biasing means such as a helical compression spring 122f positioned within the control chamber 122b and having one end seated on the diaphragm element 122c, as shown. Likewise, the second differential-pressure operated valve unit 124 comprises an air chamber 124a and a control chamber 124b in constant communication with the outlet port 118c of the above mentioned second two-position shift valve 118. Communication is provided between the air chambers 122a and 124a of the first and second differential-pressure operated valve units 122 and 124 through an opening 128 formed between the two chambers which are herein assumed to be constructed integrally. If, however, the air chambers 122a and 124a of the valve units 122 and 124 are constructed separately of each other, the communication between the two chambers may be provided by suitable passage means interconnecting the chambers, though not shown. The air chamber 124a and the control chamber 124b of the second differential-pressure operated valve unit 124 are isolated from each other by means of a diaphragm element 124c similarly to that of the first differential-pressure operated valve unit 122. The air chamber 124a of the second differential-pressure operated valve unit 124 has an outlet port 124d which is in constant communication with the above mentioned air discharge passageway 126. The diaphragm element 124c has carried thereon a valve element 124e aligned with the opening 128 between the respective air chambers 122a and 124a of the valve units 122 and 124 and movable between a first position allowing the opening 128 to open as shown and a second position closing the opening 128. The valve element 124e is urged to open the opening 128 by suitable mechanical biasing means such as a helical compression spring 124f positioned within the control chamber 124b and seated at one end on the diaphragm element 124c. When, thus, the respective solenoid coils 116d and 118d of the first and second two-position shift valves 116 and 118 remain de-energized concurrently, the two shift valves are held in their respective first conditions providing communication between the air inlet port 116a and the outlet port 116c of the first shift valve 116 and communication between the vacuum inlet port 118b and the outlet port 118c of the second shift valve 118. As a consequence, atmospheric air is admitted into the control chamber 122b of the first differential-pressure operated valve unit 122 through the air inlet port 116a and the outlet port 116c of the first shift valve 116 and, simultaneously, vacuum developed in the intake manifold 14 of the engine is directed by way of the vacuum passageway 120 and through the vacuum inlet port 118b and the outlet port 118c of the second shift valve 118 into the control chamber 124b of the second differential-pressure operated valve unit 124. The valve element 122e of the first differential-pressure operated valve unit 122 is therefore held in the previously mentioned first position closing the outlet port 122d of the air chamber 122a by the force of the compression spring 122f and, at the same time, the valve element 124f of the second differential-pressure operated valve unit 124 is held in the previously mentioned first position withdrawn from the opening 128 between the air chambers 122a and 124a of the valve units 122 and 124 despite the force of the compression spring 124f in the presence of vacuum in the control chamber 124b as shown. Communication is thus established between the second branch passageway 108b of the air feed passageway 108 and the air discharge passageway 126 by way of the air chamber 124a of the first differential-pressure valve unit 122, the opening 128 between the air chambers 122a and 124a of the valve units 122 and 124, and the outlet port 124d of the second differential-pressure operated valve unit 124. If, under these conditions, the solenoid coil 116d of the first two-position shift valve 116 is energized with the solenoid coil 118d of the second two-position shift valve 118 maintained de-energized, communication is provided between the vacuum inlet port 116b and the outlet port 116c of the first shift valve 116 so that the vacuum in the vacuum passageway 120 is directed not only to the control chamber 124b of the second differential-pressure operated valve unit 124 but to the control chamber 122b of the first differential-pressure operated valve unit 122 via the vacuum inlet port 116b and the outlet port 116c of the valve unit 116. The vacuum thus entering the control chamber 122b causes to move the valve element 122e into the previously mentioned second position thereof opening the outlet port 122d of the air chamber 122a against the opposing force of the compression spring 122e. Communication is thus established between the second branch passageway 108b of the air feed passageway 108 and the air discharge passageway 126 through the air chamber 122a of the valve unit 122 although such communication is established also through the air chamber 124a of the second differential-pressure operated valve unit 124 which is held in a condition having the valve element 124e withdrawn from the opening 128 between the air chambers 122a and 124a of the valve units 122 and 124 as previously mentioned. When, conversely, the solenoid coil 118d of the second two-position shift valve 118 is energized with the solenoid coil 116d of the first two-position shift valve 116 de-energized, then the second two-position shift valve 118 is actuated into the second condition thereof and establishes communication between the air inlet port 118a and the outlet port 118c thereof with the first two-position shift valve 116 in the first condition providing communication between the air inlet port 116a and the outlet port 116c thereof. Atmospheric air is therefore admitted not only into the control chamber 122a of the first differential-pressure operated valve unit 122 but into the control chamber 124a of the second differential-pressure operated valve unit 124 with the result that the valve element 124e of the second differential-pressure operated valve unit 124 is moved into the second position closing the opening 128 between the air chambers 122a and 124a of the valve units 122 and 124 by the force of the compression spring 124e with the valve element 122e of the first differential-pressure operated valve unit 122 held in the first position closing the outlet port 122d of the air chamber 122a. The outlet port 122d of the air chamber 122a and the opening 128 between the air chambers 122a and 124a being thus closed, communication between the second branch passageway 108b of the air feed passageway 108 and the air discharge passageway 126 is blocked. If, on the other hand, both of the solenoid coils 116d and 118d of the first and second two-position shift valves 116 and 118 are energized concurrently so that both of the shift valves 116 and 118 are held in the respective second conditions thereof, vacuum is admitted into the control chamber 122b of the first differential-pressure operated valve unit 122 and at the same time air is admitted into the control chamber 124b of the second differential-pressure operated valve unit 124. This causes the valve element 122e of the first differential-pressure operated valve unit 122 to open the outlet port 122d of the air chamber 122a and the valve element 124e of the second differential-pressure operated valve unit 124 to close the opening 128 between the air chambers 122a and 124a of the valve units 122 and 124. Communication is therefore established between the branch passageway 108b and the discharge passageway 126 solely through the air chamber 122a of the first differential-pressure operated valve unit 122. Actually, however, such a condition would not be brought about because arrangement is made so that solenoid coils 116d and 118d of both the first and second two-position shift valves 116 and 118 could not be energized concurrently, as will be understood as the description proceeds. The valve elements 122e and 124e of the above described first and second differential-pressure operated valve units 122 and 124 may be in the form of forwardly tapered needle valves so that the flow of air through each of the outlet port 122d of the air chamber 122a and the opening 128 between the air chambers 122a and 124a is decreased or increased continuously as each of the valve elements 122e and 124e is moved forwardly or backwardly through the port 122d or the opening 128. Designated by reference numeral 129 is a by-pass passageway providing direct communication between the air cleaner 48 and the intake manifold 14 over a vacuum-sensitive valve 129a which is arranged to become open in response to a vacuum higher than a predetermined level. Air is thus drawn from the air cleaner 48 into the intake manifold 14 when the vacuum in the intake manifold happens to unusually rise during, for example deceleration of the engine. The by-pass passageway 129 is, thus, adapted to prevent an occurence of back-fire during deceleration.

The electric blower 76 and both of the first and second two-position shift valves 116 and 118 above described are powered from a usual d.c. power supply arrangement of an automotive vehicle. Thus, the power supply arrangement is largely composed of a storage battery 130 and an alternator 132 having an output terminal connected through an alternator-output regulator 134 and over an ignition switch 136 to the positive terminal of the storage battery 130 by a line 138. As is well known in the art, the alternator 132 is driven by the crankshaft of the engine so as to produce electric current to operate various electrical devices of the vehicle and to charge the battery 130.

The supply of d.c. current from the power supply arrangement to the blower 76 and the first and second two-position shift valves 116 and 118 is controlled by an electric control system comprising a normally-open heat-sensitive switch 140, first and second relays 142 and 144 and a normally-open choke-position responsive switch 146. The heat-sensitive switch 140 is arranged in association with the exhaust re-combination chamber 16 and closes in response to the temperature in the exhaust re-combustion chamber 16 above a predetermined level. In the arrangement of FIG. 3, the switch 140 is shown mounted on the air jacket 68 enclosing the exhaust re-combustion chamber 14 and the heat insulating layer 66 and detects or analogizes the temperature of the heat in the re-combustion chamber 16 from the temperature of air in the air jacket 68. The first relay 142 has a relay coil 142a connected at one end to the output terminal of the previously mentioned alternator-output regulator 134 by a line 148 and grounded at the other end over the above mentioned heat-sensitive switch 140. The relay 142 further has normally-open contacts 142b connected on one hand to the above mentioned line 148 and on the other in parallel to an input terminal of the blower 76 by a line 152 and to the solenoid coil 116d of the first two-position shift valve 116 by a line 154. The blower 76 and the first two-position shift valve 116 are, therefore, kept inoperative when the temperature in the exhaust recombustion chamber 16 is lower than the above mentioned predetermined level and are energized from the alternator 132 when the temperature in the exhaust re-combustion chamber 16 becomes higher than the predetermined level and causes the heat-sensitive switch 140 to close. On the other hand, the second relay 144 has a relay coil 114a connected at one end to the output terminal of the alternator 132 over the normally-open choke-position responsive switch 146 by a line 156 and grounded at the other end by a line 158. The choke-position responsive switch 146 is mechanically linked with the choke valve shaft 56 in the air horn 52 by means of, for example, a mechanical linkage 160 connected to the wire 60 connecting the choke control knob 58 to the choke valve 56, as indicated by a broken line. The choke-position responsive switch 146 is, thus kept open when the choke valve 54 is in an angular position fully opening the air horn 52 and is closed when the choke control knob 58 is pulled by the operator of the vehicle to drive the choke valve 56 into an angular position closing the air horn 52 during cranking of the engine. If the choke valve 56 is of the automatically operated type having, for example, a thermostatic spring as previously mentioned, the choke-position responsive switch 146 may be linked either mechanically or otherwise with the thermostatic spring or directly with the choke valve so that the switch 146 is closed when the choke valve 56 is operated to close the air horn 52 during cranking of the engine. The second relay 144 further has first and second normally-open contacts 144b and 144c. The first normally-open contacts 144b is connected on one hand to the output terminal of the alternator-output regulator 134 and, over the ignition switch 136, to the positive terminal of the storage battery 130 and by a line 162 and on the other hand to the solenoid coil 118d of the second two-position shift valve 118 by a line 164. During cranking of the engine, the alternator 132 delivers no output current so that the relay coil 144a of the second relay 144 remains de-energized although the choke-responsive switch 146 is closed. When the engine is started and is being warmed up, the relay coil 144a is energized from the alternator 132 and causes the first normally-open contacts 144b to close so that the solenoid coil 118d of the second two-position valve 118 is energized from the storage battery 130 or, through the alternator output regulator 134, from the alternator 132. The second normally-open contacts 144c of the relay 144 form part of an ignition system including the ignition switch 136.

The ignition system of the internal combustion engine illustrated in FIG. 3 comprises an ignition coil 166 and an ignition distributor 168 consisting of a duel contact-plate circuit breaker assembly 170 and a distributing mechanism 172. The dual contact-plate circuit breaker assembly 170 comprises a breaker cam 174 driven by the camshaft (not shown) of the engine, advance and retard contact plates 176 and 178, and contact points 180 and 182 with which the advance and retard contact plates 176 and 178 respectively are cyclically brought into contact as the breaker cam 174 is rotated. The advance contact plate 176 is arranged to provide a usual spark advance and the retard contact plate 178 is arranged to provide ignition timings retarded a predetermined amount from the usual spark advance settings. The contact plates 176 and 178 are grounded. The ignition coil 166 has a primary winding (not shown) having one low-tension terminal p connected in parallel with the output terminal of the alternator-output regulator 134 and, over the ignition switch 136, to the positive terminal of the storage battery 130 by a line 184 and another low-tension terminal p' connected in parallel with the contact point 180 of the above mentioned advance contact plate 174 of the ignition distributor 168 by a line 186 and, over the second normally-open contacts 144c of the previously mentioned second relay 144, to the contact point 182 of the retard contact plate 178 of the distributor 168 by lines 188 and 190. The distributing mechanism 172 of the ignition distributor 168 is arranged similarly to that of an ordinary spark-ignition distributor and, thus, comprises a plurality of electrodes 192a to 192f and a rotor 194 which is electrically connected by a line 196 to the secondary winding (not shown) of the ignition coil 166 and which is driven for rotation as indicated by an arrow in synchronism with the breaker cam 174 of the circuit breaker assembly 170 through a mechanical linkage 198 indicated by a broken line. The rotor 194 is thus operative to successively connect the electrodes 192a to 192f to the secondary winding of the ignition coil 166 when driven by the breaker cam 174 as is well known in the art. The electrodes 192a to 192f of the distributing mechanism 172 are connected by lines 200a to 200f to spark plugs (not shown) of the cylinders 10a to 10f, respectively, shown in FIG. 1.

The operation of the internal combustion engine thus constructed and arranged will now be described.

When the engine is being cranked for starting, the choke control knob 58 is pulled out to hold the choke valve 54 in a position closing the air horn 52 so that the normally-open choke-position responsive switch 146 is closed. During cranking of the engine, however, the alternator 132 remains inoperative and, as a consequence, the coil 144a of the second relay 144 is maintained de-energized. The first and second normally-open contacts 144b and 144c of the relay 144 are therefore held open. On the other hand, the heat-sensitive switch 140 associated with the exhaust re-combustion chamber 16 remains open because of the low temperature of the chamber so that the coil 142a of the first relay 142 is also maintained de-energized to keep the associated normally-open contacts 142b open. The solenoid coils 116d and 118d of the first and second two-position shift valves 116 and 118 of the secondary-air supply system are therefore kept de-energized so that the first and second differential-pressure operated valve units 122 and 124 are maintained in their respective first conditions providing communication between the air inlet port 116a and outlet port 116c of the valve unit 122 and communication between the vacuum inlet port 118b and outlet port 118c of the valve unit 118. Air is thus admitted into the control chamber 122a of the first differential-pressure operated valve unit 122 and at the same time vacuum in the intake manifold 14 is directed by way of the vacuum passageway 120 and through the second two-position shift valve 118 into the control chamber 124b of the second differential-pressure operated valve unit 124. The valve elements 122e of the first valve unit 122 is thus held in its first position closing the outlet port 122d of the air chamber 122a by the force of the compression spring 122f while the valve element 124e of the second valve unit 124 is held in its first position withdrawn from the opening 128 between the air chambers 122a and 124a of the valve units 122 and 124, as illustrated in FIG. 3. Communication is thus established between the second branch passageway 108b of the air feed passageway 108 and the air discharge passageway 126 through the air chamber 122a in the first valve unit 122, the opening 128 between the air chambers 122a and 124a of the valve units 122 and 124 and the air chamber 124a and outlet port 124d of the second valve unit 124. Air delivered to the air feed passageway 108 from the air pump 104 is therefore one hand directed into the air gallery 112 through the first branch passageway 108a and on the other hand discharged to the atmosphere by way of the second branch passageway 108b and through the first and second differential-pressure operated valve units 122 and 124. During cranking of the engine, however, the delivery rate of the air pump 104 driven by the crankshaft of the engine is so low that the quantity of air distributed from the air gallery 112 to the exhaust port 30 of the engine cylinder 10 is practically negligible. For this reason, substantially no secondary air is admixed to the exhaust gases entering the exhaust re-combustion chamber 16 from each of the exhaust ports of the cylinders 10a to 10f (FIG. 1) to facilitate the exhaust re-combustion chamber 16 to be warmed up in a short period of time. Because, furthermore, the normally-open contacts 142b of the first relay 142 is kept open during cranking of the engine, the blower 76 is maintained at rest so that air in the air jacket 68 remains stagnant and is effective to minimize dissipation of heat from the exhaust re-combustion chamber 16. In the ignition system, on the other hand, the second normally-open contacts 144c of the second relay 144 is kept open as previously mentioned. The contact point 182 associated with the retard contact plate 178 is disconnected from the primary winding of the ignition coil 166 and, thus, the primary winding of the ignition coil 166 is connected only to the contact point 180 associated with the advance contact plate 176 by the line 186. The ignition timing is therefore provided on the basis of the usual spark-advance settings and facilitates the engine to be started properly.

When the engine is started and is being warmed up with the choke control knob 58 held in the pulled-out condition, the choke-position responsive switch 146 is maintained closed so that the coil 144a of the second relay 144 is energized from the alternator 132 through the switch 146, causing the first and second normally-open contacts 144b and 144c to close. The solenoid coil 118d of the second two-position shift valve 118 is consequently energized from either the storage battery 130 or, through the regulator 134, from the alternator 132 through the first normally-open contacts 144b of the second relay 144. This causes the second two-position shift valve 118 to assume its second condition providing communication between the air inlet port 118a and the outlet port 118c thereof so that atmospheric air is admitted into the control chamber 124b of the second differential-pressure operated valve unit 124. The valve element 124e of the valve unit 124 is therefore moved by the force of the compression spring 124f into its second position closing the opening 128 between the air chambers 122a and 124a of the valve units 122 and 124. Because, under these conditions, the first two-position shift valve 116 is maintained in its first condition providing communication between the air inlet port 116a and outlet port 116c with the heat-sensitive switch 140 kept open, the valve element 122e of the first differential-pressure operated valve unit 122 is maintained in its first position closing the outlet port 122d of the air chamber 122a of the valve unit 122 as shown. Communication between the air chamber 122a of the first differential-pressure operated valve unit 122 and the air discharge passageway 126 is consequently blocked and, as a consequence, air delivered from the air pump 104 is totally fed into the air feed passageway 108 and the first branch passageway 108a thereof through the one way check valve 110 and the air gallery 112 and is injected into the exhaust gases in the exhaust port 30 of the engine cylinder 10 (or, more exactly, distributed from the air gallery 112 to the exhaust ports of the individual cylinders 10a to 10f shown in FIG. 1). Secondary air is in this manner supplied to the exhaust gases in the exhaust ports of the individual engine cylinders at a rate which varies with the revolution speed of the engine crankshaft to which is drivingly connected the air pump 104 during cold driving of the engine. With the coil 144a of the second relay 144 energized, furthermore, the second normally-open contacts 144c of the relay 144 is also closed so that the contact point 182 associated with the retard contact plate 178 of the ignition distributor 168 is connected to the primary winding of the ignition coil 166. The ignition timing of the spark plug of each of the engine cylinders is therefore retarded on the basis of the retarded spark advance settings by the retard contact plate 178 with a consequent rise in the temperature of the exhaust gases from each cylinder. This enables the exhaust re-combustion chamber 16 to be warmed up in a shortened period of time.

When the engine is warmed up and reaches a normal operating temperature and the choke control knob 58 is moved into its initial position moving the choke valve 54 into a position fully opening the air horn 52, the normally-open choke-position responsive switch 146 is allowed to open and disconnects the coil 144a of the second relay 144 from the d.c. power supply system composed of the storage battery 130 and the alternator 132. The first and second normally-open contacts 144b and 144c of the relay 144 are consequently opened, de-energizing the solenoid coil 118d of the second two-position shift valve 118 and disconnecting the contact point 182 associated with the retard contact plate 178 of the ignition distributor 168 from the primary winding of the ignition coil 166. The ignition distributor 168 thus provides ignition timings dictated by the usual spark-advance settings of the advance contact plate 176 and, at the same time, the second two-position shift valve 118 of the secondary-air supply system is returned into its first condition provides communication between the vacuum inlet port 118b and outlet port 118c thereof. The vacuum in the intake manifold 14 of the engine is therefore directed through the vacuum passageway 120 and the second two-position shift valve 118 into the control chamber 118b of the second differential-pressure operated valve unit 124, causing the valve element 124e to close the opening 128 between the air chambers 122a and 124a of the valve units 122 and 124 by the force of the compression spring 124f of the valve unit 124. If, in this instance, the temperature in the exhaust re-combustion chamber 16 is lower than a predetermined level that will cause the heat-sensitive switch 140 to close, the first two-position shift valve 116 is also kept de-energized and held in its first position having the air inlet port 116a in communication with the control chamber 122a of the first differential-pressure operated valve unit 122, with the valve element 122e in its first position closing the outlet port 122d of the air chamber 122a as illustrated. Communication is thus established between the second branch passageway 108b of the air feed passageway 108 and the air discharge passageway 126 as in the case of the cranking operation so that air delivered from the air pump 104 is passed from the air passageway 108 partly to the first branch passageway 108a and partly to the second branch passageway 108b. Air entering the first branch passageway 108a is directed into the air gallery 112 through the one-way check valve 110 and is injected into the exhaust port 30 from the secondary air injection nozzle 114. On the other hand, air entering the second branch passageway 108b is directed by way of the air chambers 122a and 124a of the first and second valve units 122 and 124 and the outlet port 124d of the valve unit 124 and is discharged to the open air through the air discharge passageway 126 downstream of the outlet port 124d of the second differential-pressure operated valve unit 124. The outlet port 124d of the second differential-pressure operated valve unit 124 may be in communication with the air discharge passageway 126 via a restriction or orifice 126a which is calibrated to limit the flow of air therethrough to such an extent that the volume of air directed from the first branch passageway 108a into the exhaust port 30 is excessive for the exhaust gases to be re-combusted in the exhaust re-combustion chamber 16.

During normal iperating condition of the engine, the temperature of the heat in the exhaust re-combustion chamber 16 is lower than the predetermined level that will cause the heat-sensitive switch 140 to close and, as a consequence, the coil 142a of the first relay switch 142 remains de-energized as previously noted. The blower 76 is therefore maintained at rest so that air in the air jacket 68 stays stagnant and serves to store therein the heat transferred from the exhaust re-combustion chamber 16 and to prevent the re-combustion chamber 16 from being cooled by ambient air. The air jacket 68 thus lends itself to the purposes of (1) maintaining the temperature of the exhaust re-combustion chamber 16 at a sufficiently high level throughout the normal operating condition of the engine because of the minimum loss of heat from the re-combustion chamber, (2) increasing the exhaust cleaning efficiency of the exhaust re-combustion chamber 16 because of the elevated temperature in the re-combustion chamber, (3) reducing the overall size of the re-combustion chamber 16 because of the increased exhaust cleaning efficiency, (4) leaning out the air-fuel mixture supplied to the engine cylinders because of the increased exhaust re-combustion efficiency, and (5) improving the fuel economy by the use of the lean air-fuel mixture.

When the temperature in the exhaust re-combustion chamber 16 happens to reach or rise beyond the predetermined level, then the heat-sensitive switch 140 associated with the exhaust re-combustion chamber 16 closes and energizes the coil 142a of the first relay 142 from either the storage battery 130 or, through the alternator-output regulator 134, from the alternator 132, causing the normally-open contacts 142b to close. The solenoid coil 116d of the first two-position shift switch 116 of the secondary-air supply system is now energized from the battery 130 or the alternator 132 so that the first two-position shift valve 116 is actuated into its second condition providing communication between the vacuum inlet port 116b and outlet port 116c thereof. As a consequence, the vacuum in the intake manifold 14 of the engine is supplied by way of the vacuum passageway 120 into the control chamber 116b of the first differential-pressure operated valve unit 122 past the first two-position shift valve 116 as well as the control chamber 118b of the second differential-pressure operated valve unit 124 past the second two-position shift valve 118 which is held in its first condition with the normally-open contacts 144b of the second relay 144 kept open. Under these conditions, the valve element 122e of the first differential-pressure operated valve unit 122 is held in its second position opening the outlet port 122d of the air-chamber 122a and the valve element 124e of the second differential-pressure operated valve unit 124 is held in its first position allowing the opening 128 between the air chambers 122a and 124a of the valve units 122 and 124 to open with the result that communication is established between the second branch passageway 108b of the air feed passageway 108 and the air discharge passageway 126 through the air chamber 122a and outlet port 122d of the valve unit 122 and further through the opening 128 between the air chambers 122a and 124a of the valve units 122 and 124 and the outlet port 124d of the valve unit 124. During a condition in which an unusually high temperature occurs in the exhaust re-combustion chamber 16, a positive pressure prevails in the exhaust port 30 and, thus, the stream of air reaching the air injection nozzle 114 is resisted by the pressure of the exhaust gases acting on the nozzle 114. Air delivered from the air pump 104 is, for this reason, totally discharged to the open air by way of the second branch passageway 108b of the air feed passageway 108 and past the first which second differential-pressure operated valve units 122 and 124. Accordingly, the exhaust gases entering the exhaust re-combustion chamber 16 are supplied with substantially no secondary air and causes a rapid decline in the combustion reaction of the combustible residues in the exhaust gases in the exhaust re-combustion chamber 16, giving rise to a decrease in temperature of the re-combustion chamber. Simultaneously as the supply of secondary air to the exhaust gases is thus interrupted by the closing of the normally-open contacts 142b of the first relay 142, the blower 76 is energized and actuated to feed air into the air jacket 68 so that fresh atmospheric air is constantly circulated through the air jacket 68 to absorb heat from the exhaust re-combustion chamber 16 through the heat insulating layer 66 and directly from the exhaust pipe 20, cooling thr exhaust re-combustion chamber 16 and the exhaust pipe 20 and thereby preventing the exhaust system from being destroyed by excessive heat. The temperature of the exhaust re-combustion chamber 16 is thus lowered by slowing down the combustion reaction in the re-combustion chamber and positively cooling the re-combustion chamber by fresh air circulated through the air jacket 68. Air heated in the air jacket 68 is in part discharged to the atmosphere through the air outlet port 82 which is located in the vicinity of the leading end of the exhaust pipe 20. While air is thus being circulated through the air jacket 68, the vacuum in the intake manifold 40 is directed by way of the vacuum passageway 98 into the vacuum chamber 90 of the valve actuating unit 88 through the heat-sensitive vacuum flow control valve 100 and acts on the diaphragm element 92, thereby holding the air flow control valve 86 in a position opening the terminal end of the hot air passageway 84 against the opposing force of the compression spring 96. Air heated in the air jacket 68 is in part directed through the hot-air passageway 84 into the air cleaner 48 through the control valve 86 and heats air to be supplied to the carburetor 38. The rate of flow of hot air entering the air cleaner from the hot air passageway 84 is controlled by means of the heat-sensitive vacuum flow control valve 100 which regulates the flow of vacuum through the vacuum passageway 98 in relation to the temperature of air in the air cleaner 48.

When the temperature of the exhaust re-combustion chamber 16 is in this manner lowered below the particular level prescribed for the heat-sensitive switch 140, then the switch 140 resumes its initial open condition and de-energizes the coil 142a of the first relay 142. The normally-open contacts 142b of the relay 142 is consequently caused to open so that the first two-position shift valve 116 of the secondary-air supply system and the electric blower 76 are de-energized. The first two-position shift valve 116 is thus rendered into its first condition admitting atmospheric air into the control chamber 122b of the first differential-pressure operated valve unit 122 so that the valve element 122e of the valve unit 122 is moved by the force of the compression spring 122f into its first position closing the outlet port 122d of the air cleaner 122a as shown. Air delivered from the air pump 104 is, thus, discharged to the atmosphere through the opening 128 between the air chambers 122a and 124a of the valve units 122 and 124 and through the air discharge passageway 126 at a rate limited by the restriction or orifice 126a and is directed in major proportion into the exhaust port of each of the engine cylinders by way of the first branch passageway 108a of the air feed passageway 108 and through the air gallery 112.

Figure 4B:
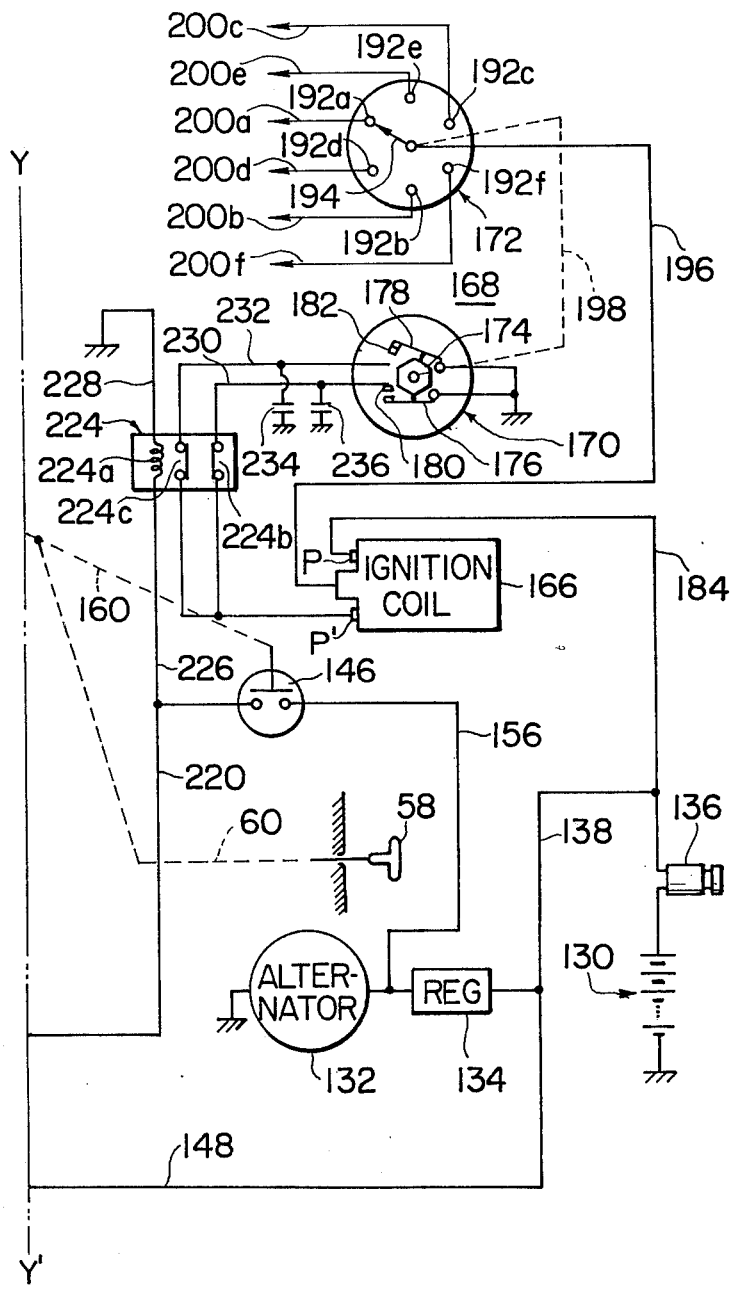
FIG. 4 is a view similar to FIG. 3 but shows a second preferred embodiment of the internal combustion engine according to the present invention.

FIG. 4 illustrates a modification of the embodiment shown in FIG. 3. While the embodiment illustrated in FIG. 3 uses a costly and space-taking air pump and valves such as the two-position shift valves 116 and 118 and differential-pressure operated valve units 122 and 124 for supplying secondary air to the exhaust gases entering the exhaust re-combustion chamber, the embodiment of FIG. 4 is arranged to contain devices to dispense with such devices for reducing the cost and the overall configuration of the engine compartment and to feed secondary air into the exhaust port of each of the engine cylinders by the use of the blower 76 during cold driving of the engine and by the aid of the pulsating, viz., alternately positive and negative pressures developed in the exhaust port. For this purpose, the secondary-air supply system of the embodiment illustrated in FIG. 4 comprises a secondary-air supply passageway 202 leading from the clean side of the air cleaner 48 and terminating in the previously mentioned air gallery 112 communicating each of the air injection nozzles such as the nozzle 114 projecting into the exhaust port 30 of the engine cylinder 10. The secondary-air supply passageway 202 has incorporated therein a flow shut-off valve 204 which is operatively connected to the choke valve shaft 56 of the air intake system by a mechanical linkage 206 as indicated by a broken line. If desired, the flow shut-off valve 204 may be connected to the mechanical linkage 60 interconnecting the choke valve shaft 56 and the choke control knob 58. The flow shut-off valve 204 operates in unison with the choke valve 54 and is, thus, usually held in a position fully opening the secondary-air supply passageway 202. When, however, the choke control knob 58 is pulled out or, as an alternative, the automatically operated position control means (not shown) for the choke valve 54 is actuated so as to turn the choke valve 54 into a position closing the air horn 52 for cranking and cold driving of the engine, then the flow shut-off valve 204 is also driven into a position fully closing the secondary-air supply passageway 202 and blocks the flow of air through the passageway 202. The secondary-air supply passageway 202 has further incorporated therein a pressure-sensitive one-way check valve 208 which is located intermediate between the flow shut-off valve 204 and the air gallery 112. The one-way check valve 208 has a first air inlet port 208a communicating through the flow shut-off valve 204 with the air cleaner 48, a second air inlet port 208b communicating with a forced-air feed passageway 210, and an outlet port 208c communicating with the air gallery 112. The one-way check valve 208 is thus adapted to open when the pressure of air developed upstream of the valve 208, viz., in the first or second air inlet port 208a or 208b is higher than the pressure developed downstream of the valve 208, viz., in the outlet port 208c and to close when the pressure, which in this instance is assumed to be positive, of the exhaust gases reaching the outlet port 208c of the valve 208 becomes higher than the pressure of air in the first or second air inlet port 208a or 208b. The forced-air feed passageway 210 leads from the air feed passageway 72 between the discharge port 74 of the blower 76 and the air jacket 68 enclosing the exhaust re-combustion chamber 16 as shown. If desired, the forced-air feed passageway 210 may originate directly in the discharge port 74 of the blower 76. The air feed passageway 72 has incorporated therein a flow shut-off valve 212 which is located between the inlet port 70 of the air jacket 68 and the junction between the passageways 72 and the passageway 210. Similarly to the flow shut-off valve 204 in the secondary-air supply passageway 202, the flow shut-off valve 212 is operatively connected to the choke valve shaft 56 by a mechanical linkage 214 as indicated by a broken line or, if desired, to the mechanical linkage 60 interconnecting the choke valve shaft 56 and the choke control knob 58. The flow shut-off valve 212 in the air feed passageway 72 is thus held in a position fully opening the passageway 72 during usual operating conditions of the engine but driven into a position closing the passageway 72 when the choke control knob 58 is pulled out or in general when the choke valve 54 is moved into a position closing the air horn 52 for cranking or cold driving of the engine.

The secondary-air supply system thus constructed and arranged is controlled by an electric control system which comprises, in addition to the previously mentioned normally-open heat-sensitive switch 140 and normally-open choke-position responsive switch 146, first and second relays 216 and 218 having respective relay coils 216a and 218a and respective normally-open contacts 216b and 218b. The coil 216a of the first relay 216 is grounded at one end and connected at the other end to the output terminal of the previously mentioned alternator 132 over the choke-position responsive switch 146 by a line 220 and the line 156. On the other hand, the coil 218a of the second relay 218 is grounded at one end over the heat-sensitive switch 140 through the line 150 and connected at the other end in parallel with the contacts 218b to the positive terminal of the storage battery 130 over the ignition switch 136 and to the output terminal of the previously mentioned alternator-output regulator 134 by the lines 148 and 138. The normally-open contacts 216b and 218b of the first and second relays 216 and 218, respectively, are connected in parallel between the above mentioned line 148 and through a line 222 the input terminal of the motor to drive blower 76. The choke-position responsive switch 146 is mechanically linked with the choke valve 54 through the mechanical linkage 160 which is connected to the mechanical linkage 60 interconnecting the choke valve shaft 56 and the choke control knob 58 as previously mentioned.

When, in operation, the engine is being cranked with the choke valve 54 held in the position closing the air horn 52, the flow shut-off valves 204 and 212 of the secondary-air supply system are also held in positions respectively closing the secondary-air supply passageway 202 leading from the air cleaner 48 and the air feed passageway 72 between the blower 76 and the air jacket 68 and, at the same time, the choke-position responsive switch 146 closes. During cranking of the engine, however, no output current is produced by the alternator 132 and, as a consequence, the coil 216a of the first relay 216 remains de-energized. The coil 218a of the second relay 218 also remains de-energized because the heat-sensitive switch 140 is maintained open responsive to the low temperature of the exhaust recombustion chamber 16. The normally-open contacts 216b and 218b of the first and second relays 216 and 218 are thus kept open so that the electric blower 76 stays at rest. Secondary air is therefore not supplied to the exhaust gases because the blower 76 stays at rest and the flow shut-off valve 204 in the secondary air supply passageway 202 is in a position closing the passageway 202 as above mentioned. When, however, the engine is started and is being operated for warmup, the alternator 132 commences to supply a d.c. current to the coil 216a of the first relay 216 through the choke-position responsive switch 146 which is kept closed with the choke valve 54 maintained in the position closing the air horn 52. The normally-open contacts 216b of the first relay 216 is accordingly caused to close and causes the motor of the blower 76 to be energized by the battery 130 or, through the regulator 134, by the alternator 132. The blower 76 now commences to deliver air from its discharge port 74. Since, under this condition, the flow shut-off valve 212 in the air passageway 72 between the blower 76 and the air jacket 68 is held in the position shutting off the flow of air into the inlet port 70 of the air jacket, air delivered from the blower 76 is totally passed to the forced-air feed passageway 210 and admitted into the second air inlet port 208b of the one-way check valve 208, which is therefore caused to open. Air delivered from the blower 76 is thus continuously fed into the exhaust port of each of the engine cylinders by virtue of the combined effects of the suction occuring downstream of the valve 208 and the positive air pressure developed upstream of the valve 208 when the exhaust gases assume a negative pressure or because of the fact that the pressure of air pumped into the valve 208 overcomes the pressure developed downstream of the valve 208 when the exhaust gases assume a positive pressure. The blower 76 is in this fashion utilized as a source of secondary air during engine warmup operation when the blower need not supply air to the air jacket 68 because the temperature of the exhaust re-combustion chamber 16 is maintained at a low level.

When the engine is warmed up and the choke valve 54 is returned to the position fully opening the air horn 52 through, for example, manipulation of the choke control knob 58, then the flow shut-off valves 204 and 212 are moved into their positions respectively fully opening the secondary-air supply passageway 52 leading from the air cleaner 48 and the air feed passageway 72 between the blower 76 and the air jacket 68 and, at the same time, the coil 216a of the first relay 216 is de-energized to allow the associated normally-open contacts 216b to open and brings the blower 76 to a stop. The supply of air from the blower 76 to the exhaust gases through the forced-air feed passageway 210 is consequently interrupted and, in turn, air is directed from the air cleaner 48 through the secondary-air supply passageway 202 and the flow shut-off valve 204 and the one-way check valve 208 into the exhaust port of each of the engine cylinders in cycles when vacuum is developed in the exhaust port. When the engine is operating in normal condition, both of the relays 216 and 218 remain open so that the blower 76 is maintained inoperative. In the event, however, the temperature of the exhaust re-combustion chamber 16 unusually rises above the predetermined level previously mentioned, the heat-sensitive switch 140 associated with the exhaust re-combustion chamber 16 closes and energizes the coil 218a of the second relay 218. The normally-open contacts 218b of the relay 218 is therefore caused to close and energizes the blower 76, which is thus actuated to feed air into the air jacket 68 through the flow shut-off valve 212 in the air feed passageway 72. Air from the blower 76 is circulated through the air jacket 68, absorbs heat from the exhaust re-combustion chamber 16 and the exhaust pipe 20 and is in part discharged to the open air through the air outlet port 82 and in part directed into the air cleaner 48 through the hot-air passageway 84 through the air flow control valve 86, as previously described with reference to FIG. 3. When the exhaust re-combustion chamber 16 thus cooled restores its usual temperature, the heat-sensitive switch 140 opens to de-energize the coil 218a of the second relay 218 so that the blower 76 is rendered inoperative and ceases to feed air into the air jacket 68.

In the embodiment of FIG. 4, the ignition system is illustrated to comprise a relay 224 which has a relay coil 224a, normally-closed contacts 224b and normally-open contacts 224c. The coil 224a is connected at one end to the output terminal of the alternator 132 by a line 226 and the line 156 over the previously mentioned choke-position responsive switch 146 and is grounded at the other end through a line 228. The ignition coil 166 having one low tension terminal p connected to the d.c. power supply system has another low tension terminal P' connected in parallel to the contact points 180 and 182 associated with the previously mentioned advance and retard contact plates 176 and 178, respectively, ignition distributor 168 over the normally-closed and normally-open contacts 224b and 224c, respectively, of the relay 224 by lines 230 and 232. Under usual operating conditions of the engine with the choke-position responsive switch 146 kept open, the coil 224a of the relay 224 is de-energized and maintains the normally-closed contacts 224b closed and the normally-open contacts 224c open. The primary winding (not shown) of the ignition coil 166 is therefore connected to ground through the normally-closed contacts 224b of the relay 224 and the advance contact plate 176 of the distributor 168 so that the ignition timings of the individual engine cylinders are provided on the basis of the usual spark-advance settings on the advance contact plate 176. When, however, the engine is being driven cold with the choke-position responsive switch 146 held closed, the coil 224a of the relay 224 is energized from the output terminal of the alternator 132 through the switch 146 so that the normally-closed contacts 224b of the relay 224 is caused to open and, in turn, the normally-open contacts 224c of the relay 224 are caused to close. The contact point 180 associated with the advance contact plate 176 of the distributor 168 is consequently disconnected from the primary winding of the ignition coil 166 which is now connected through the normally-open contacts 224c of the relay 224 to the contact point 182 associated with the retard contact plate 178 of the distributor 168 with the result that the ignition timings of the individual engine cylinders are provided on the basis of the retarded spark-advance settings on the retard contact plate 178. When the engine is being cranked for starting, the coil 224a of the relay 224 remains de-energized so as to maintain the normally-closed and normally-open contacts 224b and 224c closed and open, respectively, although the choke-position responsive switch 146 is kept closed because no output current is delivered from the alternator 132. Designated by reference numerals 234 and 236 are ignition condensers which are respectively connected between the above mentioned lines 230 and 232 and ground.

As is well known in the art, the spark-advance settings providing maximum engine power output and optimum emission control performance vary with the richness of the air-fuel mixture supplied to an engine cylinder. In the internal combustion engine of the type having the rich-mixture and lean-mixture cylinders, therefore, it is preferable that the spark-advance settings be varied between the set of rich-mixture cylinders and the set of the lean-mixture cylinders so as to enable the engine to produce maximum power output and achieve optimum emission control performance. FIGS. 5 and 6 illustrate preferred examples of the ignition system which is arranged to provide such spark-advance settings. The ignition system shown in FIG. 5 is an alternative to its counterpart in the internal combustion engine illustrated in FIG. 3, and the ignition system shown in FIG. 6 is an alternative to its counterpart in the internal combustion engine illustrated in FIG. 4.

Referring to FIG. 5, the ignition system comprises first and second ignition coils 166a and 166b, first and second ignition distributors 168a and 168b and first and second relays 238 and 240. The first and second ignition distributors 168a and 168b are constructed essentially similarly to each other and comprise respective dual contact-plate circuit braker assemblies 170a and 170b and respective distributing mechanisms 172a and 172b. The circuit breaker assemblies 170a and 170b respectively comprise breaker cams 174a and 174b driven by the camshaft (not shown) of the engine, advance contact plates 176a and 176b, retard contact plates 178a and 178b, contact points 180a and 180b respectively associated with the advance contact plates 176a and 176b, and contact points 182a and 182b respectively associated with the retard contact plates 178a and 178b. The distributing mechanism 172a of the first ignition distributor 168a comprises a rotor 194a connected to the breaker cam 174a of the circuit breaker assembly 172a by a mechanical linkage 198a indicated by a broken line 198a and electrodes 192a, 192b and 192c which are electrically connected by lines 200a, 200b and 200c to the ignition spark plugs (not shown) of the previously mentioned rich-mixture cylinders 10a, 10b and 10c, respectively, of the internal combustion engine illustrated in FIG. 1. On the other hand, the distributing mechanism 172b of the second ignition distributor 168b comprises a rotor 194b mechanically connected to the breaker cam 174b of the circuit breaker assembly 172b by a mechanical linkage 198b and electrodes 192d, 192e and 192f which are electrically connected by lines 200d, 200e and 200f to the spark plugs (not shown) of the previously mentioned lean-mixture cylinders 10d, 10e and 10f of the engine illustrated in FIG. 1.

The first and second relays 238 and 240 comprise respective relay coils 238a and 240a which are connected in parallel to the output terminal of the alternator 132 by lines 226a and 226b, respectively, over the previously mentioned normally-open choke-position responsive switch 146 and which are connected to ground by lines 228a and 228b, respectively. The first relay 238 comprises normally-open contacts 238a connected by the lines 162 and 164 between the output terminal of the d.c. power supply circuit consisting of the battery 130 and the alternator 132 and the solenoid coil 118d of the two-position shift valve 118 of the secondary-air supply system (FIG. 3). The relay 238 has a second normally-open contacts 238c. The first ignition coil 166a has a primary winding (not shown) connected at one terminal p to the output terminal of the above mentioned d.c. power supply circuit by a line 184a and at the other low tension terminal p' in parallel to the contact point 180a associated with the advance contact plate 176a of the first ignition distributor 168a by a line 186a and, over the second normally-open contacts 238c of the second relay 238, to the contact point 182a associated with the retard contact plate 178a of the distributor 168a by line 190a. The ignition coil 166a has a secondary winding (not shown) connected to the rotor 194a of the first distributor 168a by a line 196a. On the other hand, the second relay 242 has normally-open contacts 242b. The second ignition coil 166b has a primary winding (not shown) connected at one low tension terminal q to the output terminal of the previously mentioned d.c. power supply circuit by a line 184b and at the other low tension terminal q' in parallel to the contact point 180b associated with the advance contact plate 176b of the second ignition distributor 168b by a line 186b and, over the normally-open contacts 242b of the relay 242, to the contact point 282b associated with the retard contact plate 178b of the distributor 168b by lines 188b and 190b. The circuit breaker assembly 170a of the first ignition distributor 168a arranged so that the advance contact plate 176a provides ignition timings based on spark-advance characteristics optimum for the rich-mixture cylinders 10a to 10c (FIG. 1) under normal operating conditions and the retard contact plate 178a provides ignition timings based on spark advance characteristics retarded a predetermined amount from the spark advance characteristics prescribed on the advance contact plate 176a. Likewise, the circuit breaker assembly 170b of the second ignition distributor 168b is so arranged that the advance contact plate 176b provides ignition timings based on spark advance characteristics optimum for the lean-mixture cylinders 10d to 10f (FIG. 1) under normal operating conditions and the retard contact plate 178b provides ignition timings which are based on spark advance characteristics retarded a predetermined amount from the spark advance characteristics prescribed for the advance contact plate 176b. When, thus, the engine is operating in normal conditions with the choke-position responsive switch 146 kept open, the coils 238a and 240a of the first and second relays 238 and 240 remain de-energized and, as a consequence, the normally-open contacts 238c and 240b of the relays are maintained open so that the respective primary windings of the first and second ignition coils 166a and 166b are connected by the lines 186a and 186b to the contact points 180a and 180b of the first and second ignition distributors 168a and 168b, respectively. The ignition timings of the rich-mixture cylinders 10a to 10c (FIG. 1) are therefore governed by the spark advance characteristics prescribed for the advance contact plate 176a of the first ignition distributor 168a and, likewise, the ignition timings of the lean-mixture cylinders 10d to 10f (FIG. 1) are governed by the spark advance characteristics prescribed for the advance contact plate 176b of the second ignition distributor 168b. When, however, the engine is being warmed up and the choke-position responsive switch 146 is closed, the coils 238a and 240a of the first and second relays 238 and 240 are energized from the alternator 132 through the switch 146 and as a consequence the normally-open contacts 238c and 240b of the relays 238 and 240 are caused to close so that the respective primary windings of the first and second ignition coils 166a and 166b are connected through the contacts 238c and 240b of the relays to the contact points 182a and 182b of the first and second ignition distributors 168a and 168b, respectively. It therefore follows that the ignition timings of the rich-mixture cylinders 10a to 10c (FIG. 1) are governed by the spark advance characteristics prescribed on the retard contact plate 178a of the first ignition distributor 168a and the ignition timings of the lean-mixture cylinders 10d to 10f (FIG. 1) are governed by the spark advance characteristics prescribed for the retard contact plate 178b of the second ignition distributor 168b. The ignition timings of both the rich-mixture and lean-mixture cylinders are retarded during cold driving of the engine from those provided by the usual spark advance characteristics so that the exhaust re-combustion chamber 16 is warmed up in a shottened period of time and as a consequence the exhaust emission is cleaned at an increased efficiency. When the engine is warmed up and the choke-position responsive switch 146 is made open, the coils 238a and 240a of the first and second relays 238 and 240 are de-energized with the result that the ignition timings of the rich-mixture and lean-mixture cylinders are dictated by the spark advance characteristics prescribed for the advance contact plates 176a and 176b of the first and second ignition distributors 168a and 168b, respectively. When the engine is being cranked, the alternator 132 is unable to produce an output current and, for this reason, the coils 232a and 240a of the first and second relays 238 and 240 are also kept de-energized although the choke-position responsive switch 146 is closed. During cranking, therefore, the ignition timings of the cylinders are also governed by the spark advance characteristics which are prescribed for the advance contact plates 176a and 176b of the first and second ignition distributors 168a and 168b.

FIG. 6 illustrates a modification of the ignition system above described. The ignition system herein shown also comprises first and second ignition coils 166a and 166b and a first and second ignition distributors 168a and 168b which are arranged similarly to their counterparts of the ignition system illustrated in FIG. 5 and which are thus respectively associated with the set of rich-mixture cylinders 10a and 10c and the set of lean-mixture cylinders 10d to 10f (FIG. 1). The ignition system shown in FIG. 6 is, moreover, intended as an alternative to the ignition system illustrated in FIG. 4 and is thus combined with the relays 216 and 218 which are arranged to make the blower 76 (FIG. 4) operative not only in response to an undue rise of the temperature of the exhaust re-combustion chamber 16 but during engine warm-up operation. In addition to the ignition coils 166a and 166b and the distributors 168a and 168b, the ignition system illustrated in FIG. 6 comprises first and second relays 244 and 246 having respective relay coils 244a and 246b connected in parallel to the output terminal of the alternator 132 by lines 248 and 250 over the previously mentioned choke-position responsive switch 146. The relays 244 and 246 further have respective normally-closed contacts 244b and 246b and respective normally-open contacts 244c and 246c. The first ignition coil 166a has its low tension terminal p' connected in parallel to contact points 180a and 182a of the first ignition distributor 168a over the normally-closed and normally-open contacts 244b and 244c, respectively, of the first relay 244 and, likewise, the second ignition coil 166b has its low tension terminal q' connected in parallel to the contact points 180b and 182b, respectively, of the second ignition distributor 168b over the normally-closed and normally-open contacts 246b and 246c, respectively, of the second relay 246. When, thus, the engine is in a normally operating condition with the choke-position responsive switch 146 kept open, the coils 244a and 246a of the first and second relays 244 and 246 remain de-energized so that the normally-closed contacts 244b and 246b of the relays 244 and 246 are maintained closed and the normally-open contacts 244c and 246c of the relays are maintained open. The respective primary windings (not shown) of the first and second ignition coils 166a and 166b are therefore connected through the normally-closed contacts 244b and 246b of the relays 244 and 246 to the contact points 180a and 180b of the first and second ignition distributors 168a and 168b, respectively. The ignition timings of the engine cylinders are thus dictated by the spark advance settings of the respective advance contact plates 176a and 176b of the first and second ignition distributors 168a and 168b. These conditions are established also during cranking of the engine when the alternator 132 is held inoperative although the choke-position responsive switch 146 is closed. When, however, the engine is being warmed up after cranking, the coils 244a and 246a of the first and second relays 244 and 246 as well as the coils 216a of the previously described relay 216 are energized from the alternator 132 through the choke-position responsive switch 146. As a consequence, the normally-closed contacts 144b and 246b of the first and second relays 244 and 246 are rendered open and, in turn, the normally-open contacts 244c and 246c of the relays 244 and 246 are made closed. The contact points 180a and 180b associated with the advance contact plates 176a and 176b of the first and second ignition distributors 168a and 168b are disconnected from the primary windings of the first and second ignition coils 166a and 166b, respectively, and the contact points 182a and 182b associated with the retard contact plates 178a and 178b of the distributors 168a and 168b are connected to the primary windings of the ignition coils 166a and 166b, respectively. The ignition timings of the engine cylinders are therefore retarded from the timings governed by the normal spark advance characteristics prescribed on the advance contact plates 176a and 176b of the distributors 168a and 168b during engine warm-up operation when the blower 76 (FIG. 4) is actuated to supply secondary air to the exhaust gases.

If desired, each of the ignition systems thus far described with reference to FIGS. 5 and 6 may be modified in such a manner that the ignition timings of only the rich-mixture cylinders are retarded during engine warm-up operation in which the performance characteristics of the exhaust re-combustion chamber are governed largely by the performance characteristics of the rich-mixture. For this purpose, the retard contact plate 178b and the associated contact point 182b of the second ignition dstributor 168b, the second relay 240 or 246 and the associated wiring arrangement may be removed from each of the ignition systems shown in FIGS. 5 and 6 so that the primary winding of the second ignition coil 166b is at all times connected to the contact point 180b associated with the contact plate 176b which is arranged to provide normal spark advance characteristics optimum for the operation of the lean-mixture cylinders.

What is claimed is:

1. A spark-ignition multiple-cylinder internal combustion engine for an automotive vehicle, comprising in combination first and second sets of cylinders, a mixture induction system for supplying an air-fuel mixture richer than a stoichiometric mixture to said first set of cylinders and an air-fuel mixture leaner than the stoichiometric mixture to said second set of cylinders, an air-intake system for supplying air to said mixture induction system, an exhaust system to which said cylinders are jointly connected, an exhaust re-combustion chamber incorporated into said exhaust system for mixing and re-combusting exhaust gases from said cylinders, first heat-exchange means associated with said exhaust re-combustion chamber and responsive to the temperature of the exhaust re-combustion chamber for absorbing heat from the re-combustion chamber in a heated condition, second heat-exchange means associated with said air-intake system and responsive to medium to low load operating conditions of the engine for warming up air in the air-intake system during the medium to low load operating conditions, secondary-air supply means responsive to the temperature of said exhaust re-combustion chamber and to cold driving condition of the engine for supplying secondary air to the exhaust gases entering the exhaust re-combustion chamber at a rate varying with engine load during the medium to low load operating conditions and peaking up during the cold driving condition, a spark ignition system responsive to the cold driving condition of the engine for retarding the ignition timings of at least said first set of cylinders, said first heat-exchange means including an air jacket having a portion enclosing said exhaust re-combustion chamber and having a first air outlet port directly open to the atmosphere and a second air outlet port communicating with said second heat-exchange means, an electrically-operated positive-displacement air-feed unit for feeding air into said air jacket when energized, and an electric control circuit responsive to the temperature of said exhaust re-combustion chamber and operative to energize said air-feed unit when the temperature of the exhaust re-combustion chamber rises to a predetermined level.

2. An internal combustion engine as claimed in claim 1, in which said air jacket has another portion enclosing a portion of said exhaust system downstream of said exhaust re-combustion chamber.

3. An internal combustion engine as claimed in claim 1, in which said second heat-exchange means comprise a hot-air passageway leading from said second air outlet port of said air jacket and terminating in said air-intake system and valve means responsive to medium to low load operating conditions of the engine and operative to control the flow of air directed from said hot-air passageway into said air-intake system in accordance with engine load.

4. An internal combustion engine as claimed in claim 3, in which said valve means comprise an airflow control valve in said hot-air passageway, a vacuum passageway leading from a downstream portion of said mixture induction system and a vacuum-sensitive valve actuating unit responsive to the vacuum developed in said vacuum passageway for varying the opening degree of said air flow control valve.

5. An internal combustion engine as claimed in claim 4, in which said valve means further comprise a heat-sensitive vacuum-flow control valve responsive to the temperature of air in said air-intake system for regulating the flow of vacuum through said vacuum passageway on the basis of the temperature of air in the air-intake system.

6. An internal combustion engine as claimed in claim 1, in which said secondary-air supply means comprise a positive-displacement air-feed unit having a suction port communicating with said air-intake system, an air-feed passageway providing communication between the delivery port of said air-feed unit and the exhaust port of each of said cylinders, and air-discharge valve means connected to said air-feed passageway and responsive to the vacuum developed in a downstream portion of said mixture induction system, the cold driving condition of the engine and the temperature of said exhaust re-combustion chamber for regulating the flow of air through said air-feed passageway on the basis of said vacuum during medium to low operating conditions of the engine, providing substantially unrestricted communication between said air-feed passageway and the exhaust port of each of said cylinders under the cold driving condition of the engine, and providing unlimited communication between said air-feed passageway and the atmosphere when the temperature of said exhaust re-combustion chamber rises to a predetermined level.

7. An internal combustion engine as claimed in claim 6, in which said air-discharge valve means comprise a first two-position shift valve having a first condition passing therethrough the vacuum directed from said downstream portion of said mixture induction system and a second condition open to the atmosphere, a second two-position shift valve having a first condition open to the atmosphere and a second condition passing therethrough the vacuum from said downstream portion of said mixture induction system, a first differential-pressure operated valve unit having a first condition responsive to the first condition of said first two-position shift valve for blocking communication of said air-feed passageway with the atmosphere and a second condition responsive to the second condition of said first two-position shift valve for providing said substantially unlimited communication between said air-feed passageway and the atmosphere, a second differential-pressure operated valve unit having a first condition responsive to the first condition of said first two-position shift valve for providing limited communication between said air-feed passageway and the atmosphere and a second condition responsive to the second condition of said second two-position shift valve for blocking the communication between said air-feed passageway and the atmosphere, and electrical control means responsive to the temperature of said exhaust re-combustion chamber and to cold driving condition of the engine for actuating said first two-position shift valve into the second condition thereof when the temperature of said exhaust re-combustion chamber reaches said predetermined level and actuating said second two-position shift valve into said second condition thereof during cold driving of the engine.

8. An internal combustion engine as claimed in claim 7, in which each of said first and second two-position shift valves has an air inlet port open to the atmosphere, a vacuum inlet port communicating with said downstream portion of said mixture induction system and an outlet port, the first two-position shift valve providing communication between the air inlet port and the outlet port thereof when held in said first condition thereof and between the vacuum inlet port and the outlet port thereof when held in said second condition thereof and said second two-position shift valve providing communication between the vacuum inlet port and the outlet port thereof when held in said first condition thereof and between the air inlet port and the outlet port thereof when held in said second condition thereof, and in which said first and second differential-pressure operated valve units have respective control chambers respectively in communication with the outlet ports of said first and second two-position shift valves, respective air chambers separated from said control chambers by respective diaphragm elements, passage-means for providing communication between the two air chambers, respective air outlet ports for venting the respective air chambers to the atmosphere, respective valve elements respectively movable with said diaphragm elements, the valve element of said first differential-pressure operated valve unit being movable between first and second positions respectively closing and opening the air outlet port of the first valve unit and the valve element of said second differential-pressure operated valve unit being movable between first and second positions respectively opening and closing said passage means between said air chambers, and respective biasing means for urging the associated valve elements toward the first positions thereof.

9. An internal combustion engine as claimed in claim 8, in which said second differential-pressure operated valve unit further has a restriction in the air outlet port thereof.

10. An internal combustion engine as claimed in claim 1, in which said secondary-air supply means comprise an air-feed passageway leading from said air-intake system, first flow shut-off means in said air-feed passageway, said flow-shut off means being responsive to cold driving condition of the engine for closing said air-feed passageway during the cold driving condition, a forced-air feed passageway leading from said positive-displacement air-feed unit, second flow shut-off means positioned between the air-feed unit and said air jacket, said second flow shut-off valve means being responsive to the cold driving condition of the engine for blocking communication between the air-feed unit and said air-jacket during the cold driving condition of the engine, and a one-way check valve having a first inlet port communicating with said air-feed passageway through said first flow shut-off valve means, a second inlet port in constant communication with said forced-air feed passageway and an outlet port communicating with the exhaust port of each of said cylinders, said one-way check valve having means operative to provide communication between each of said first and second inlet ports and said outlet port thereof in the presence of suction in the outlet port or when the pressure of air in at least one of said first and second inlet ports is higher than the pressure developed in said outlet port.

11. An internal combustion engine as claimed in claim 1, said ignition system comprises an ignition coil, an ignition distributor having a first set of contact points arranged to provide spark-advance characteristics optimum for normal operating conditions of said cylinders and a second set of contact points arranged to provide ignition timings retarded from said spark-advance characteristics, and switch means responsive to cold driving condition of the engine and operative to provide electrical connection between the primary winding of said ignition coil and said first set of contact points during cranking and normal operating conditions of the engine and between the primary winding of said ignition coil and said second set of contact points during cold driving condition of the engine.

12. An internal combustion engine as claimed in claim 1, in which said ignition system comprises first and second ignition coils, first and second ignition distributors respectively connected to the spark plugs of said first and second sets of cylinders, said first distributor having a first set of contact points arranged to provide spark-advance characteristics optimum for normal operating conditions of said first set of cylinders and a second set of contact points arranged to provide ignition timings retarded from said spark-advance characteristics and said second ignition distributor having a first set of contact points arranged to provide spark-advance characteristics optimum for normal operating conditions of said second set of cylinders and a second set of contact points arranged to provide ignition timings retarded from said spark-advance characteristics prescribed on the first set of contact points of said second ignition distributor, and first and second switch means responsive to cold driving condition of the engine and each operative to provide electrical connection between primary winding of each of said first and second ignition coils and the first set of contact points of each of said first and second ignition distributors during cranking and normal operating conditions of the engine and between each of the primary windings of said coils and the second set of contact points of each of said ignition distributors during cold driving condition of the engine.

13. An internal combustion engine as claimed in claim 1, in which said ignition system comprises first and second ignition coils, first and second ignition distributors respectively electrically connected to the spark plugs of said first and second sets of cylinders, said first ignition distributor having a first set of contact points arranged to provide spark-advance characteristics optimum for normal operating conditions of the first set of cylinders and a second set of contact points arranged to provide ignition timings retarded from said spark-advance characteristics and said second ignition distributor having a single set of contact points arranged to provide usual spark-advance characteristics, and switch means responsive to cold driving condition of the engine and operative to provide electrical connection between the primary winding of said second ignition coil and said first set of contact points during cranking and normal operating conditions of the engine and between the primary winding of said second ignition coil and said second set of contact points during the cold driving condition of the engine.

* * * * *